(12) United States Patent
Argiro

(10) Patent No.: US 9,155,960 B2
(45) Date of Patent: Oct. 13, 2015

(54) VIDEO-GAME CONSOLE FOR ALLIED TOUCHSCREEN DEVICES

(71) Applicant: Chris Argiro, Toronto (CA)

(72) Inventor: Chris Argiro, Toronto (CA)

(*) Notice: Subject to any disclaimer, the term of this patent is extended or adjusted under 35 U.S.C. 154(b) by 29 days.

(21) Appl. No.: 13/941,426

(22) Filed: Jul. 12, 2013

(65) Prior Publication Data

US 2013/0303281 A1    Nov. 14, 2013

Related U.S. Application Data

(60) Provisional application No. 61/751,596, filed on Jan. 11, 2013.

(51) Int. Cl.
| | | |
|---|---|---|
| A63F 9/24 | (2006.01) | |
| A63F 13/00 | (2014.01) | |
| A63F 13/2145 | (2014.01) | |
| A63F 13/98 | (2014.01) | |
| A63F 13/20 | (2014.01) | |
| A63F 13/211 | (2014.01) | |
| A63F 13/219 | (2014.01) | |
| A63F 13/92 | (2014.01) | |
| A63F 13/28 | (2014.01) | |

(52) U.S. Cl.
CPC .............. *A63F 13/00* (2013.01); *A63F 13/02* (2013.01); *A63F 13/06* (2013.01); *A63F 13/211* (2014.09); *A63F 13/219* (2014.09); *A63F 13/2145* (2014.09); *A63F 13/28* (2014.09); *A63F 13/92* (2014.09); *A63F 13/98* (2014.09)

(58) Field of Classification Search
CPC ............ A63F 13/06; A63F 2300/6045; A63F 13/2145
USPC .............................. 463/33, 36, 37, 40, 43–45
See application file for complete search history.

(56) References Cited

U.S. PATENT DOCUMENTS

| | | | |
|---|---|---|---|
| 6,966,837 B1 * | 11/2005 | Best ................................ 463/33 |
| 7,899,915 B2 * | 3/2011 | Reisman ....................... 709/228 |
| 2012/0309462 A1 * | 12/2012 | Micev ............................ 455/566 |
| 2012/0309516 A1 * | 12/2012 | Langridge et al. .............. 463/31 |

* cited by examiner

*Primary Examiner* — David L Lewis
*Assistant Examiner* — Robert Mosser
(74) *Attorney, Agent, or Firm* — Carrier Blackman & Associates, P.C.; Joseph P. Carrier; William D. Blackman

(57) ABSTRACT

The creation of a video-game console for use with an allied touchscreen device or device plurality such as a smartphone and/or tablet is described. The allied touchscreen device may serve as the external media source for the video-game console assembly and further in modelling the input and output dynamics of said device under the ascendency of serviceable mapping systems. A series of specialty-input controllers for interaction with the present invention are also advanced by the inventor; including those designed for remote manipulation of an actionable sensor input where salient to the input dynamics of an engaged gaming title.

31 Claims, 14 Drawing Sheets

VIDEO-GAME CONSOLE FOR ALLIED TOUCHSCREEN DEVICES

RELATIONSHIP TO OTHER APPLICATIONS

This application claims the benefit of provisional application 61/751,596 as filed on Jan. 11, 2013 with The USPTO. This application further claims the benefit of U.S. Ser. No. 13/720,855, which is a continuation-in-part of U.S. Ser. No. 13/249,194, filed Sep. 29, 2011 and claiming the benefit of U.S. Provisional application No. 61/499,1002 filed on Jun. 20, 2011; common-ownership filings of which all are collectively incorporated by reference herein, as if fully set forth in their entirety, for all purposes. Furthermore, this application is a natural extension to the inventor's prior, kindred submissions and claims full benefit of provisional applications 61/282,692, 61/344,908 and 61/702,721 with The USPTO; patent Ser. No. 13/005,315 with The USPTO and International applications PCT/IB2011/051049 and WO/2011/114276 with The WIPO; all of which are under the common ownership of the inventor and collectively incorporated by reference herein, as if fully set forth in their entirety, for all purposes.

BACKGROUND OF THE INVENTION

Many pundits believe the future of gaming is via a touchscreen device interface. Traditional touchscreen gaming, in its present state, lacks the more advanced controllers and heightened gaming experience that may only be enjoyed under the more robust gaming platform of traditional video-game consoles and additionally lacks the delivery system present under a traditional video-game console environment. The present invention seeks to introduce a new delivery system, interactive platform and specialty controller compliment for video games played on touchscreen devices by virtue of developing a novel video-game console designed for coupling or synergistic integration with touchscreen-devices (exempli gratia, introducing an allied touchscreen device to act as the external media of the video-game console assembly and modelling the input and output dynamics of said device under the ascendency of serviceable mapping systems). As an intermediary device, the video-game console is capable of acting as an automating agent for more seamless and expeditious game start up and for advanced operative delivery in a fluid gaming environment. The video-game console's operational assimilation with compatible remote input controllers and a remote live output, as advanced by the present invention, are designed to replicate the layout of apparatus familiar to traditional gaming consoles and to advance a closer degree of operational parallelism between the two platform offerings.

ABRIDGED SUMMARY

It is to be understood that both the following abridged summary and the detailed description that follows are intended to be exemplary and explanatory in nature; with the intent and purpose of its teachings to facilitate understanding of the claimed invention. Neither the abridged summary, the specification that follows, nor the attached claims are intended to define or limit the scope of the invention in any regard. Design, construction, the presence of features and actual use of a manufactured product (or its relationship to a complimentary component whilst in use), exempli gratia, may vary from this body of work while still remaining faithful to the spirit and scope of this discourse.

Embodiments herein are directed to systems, devices and methods for creating a unique content delivery platform and actionable system for allied touchscreen devices; whereas an embedded application in said touchscreen device may act as the external media and the allied module may be further prone to remote, manipulable influence of its actionable inputs for thematic transition to a gaming-console type environment for allied touchscreens; as advanced by its teachings. An additional embedded application may, where spirited into a controller environment, concurrently serve as a virtual mapping interface to address the actionable content furnished by said external media.

Use of an intermediary-transceiver device, in both an attachmentless and ramifying-interface (such as an attachment overlay) disposition for strategically deploying a capacitive charge or charge series to actionable touchscreen content, and their potential inclination to a console-gaming environment of the present invention, are described herein.

A wireless-controller assembly (amongst a very broad brush stroke of serviceable controller integration) and complementary pairing app that can be integrated into a video-game console environment of the present invention, with or without use of an intermediary-transceiver device and attachment interface, are described. A plurality of light-gun or akin-based specialty-input controllers help lengthen said brush stroke and are mobilized by the inventor for remote and empowering control of an actionable input such as, but not limited to, an actionable object displayed on an equipped touchscreen. A mirrored-assembly supporting actionable visual acuity for the advancement of light-gun integration into a touchscreen's controller environment is further discussed.

Through exemplary discourse, the inventor's teachings additionally disclose a robust and highly-dynamic input-controller apparatus and system for touchscreen devices offering the gamer an advanced medley of user-influenced inputs and its related mapping discourse, including mechanical and virtual (or non-mechanical) sensor-based manipulation and mapping translation to a touchscreen device. Technology-specific mechanical manipulation of an input sensor or sensor plurality—and exemplary design implementations of an apparatus thereof—are thus advanced; including addressing the potential for physical limitations of component hardware comprising the console assembly (e.g. introducing an anti-twist connector apparatus) that may be present under the recurring movement of a mechanical influence.

Additional input modalities, including the leveraging of an associated camera and sensor hardware of a gaming console of the present invention to interactively track, without suggestion of limitation, a user's fingers and integrative gestures (including body movement) for translation to a touchscreen environment are described. An at least two-ring digital system of actionable manipulation is advanced under the governance of an associated camera; as is the use of a mapping-specific virtual matrix designed to facilitate comprehensive mapping coverage of all salient screen domain of an associated or allied touchscreen device in a console environment.

These and other objects of the present invention will become apparent with reference to the foregoing and the following disclosure, the attached drawings and the accompanying claims.

BRIEF DESCRIPTION OF THE DRAWINGS

Images expressed in this application are for embodiment-based illustrative purposes only and are not suggestive of limitation; a manufactured iteration of an embodiment may vary from these articulations, while still preserving the spirit and scope of, and serviceability to, said embodiment.

DETAILED DESCRIPTION

Figure 1:
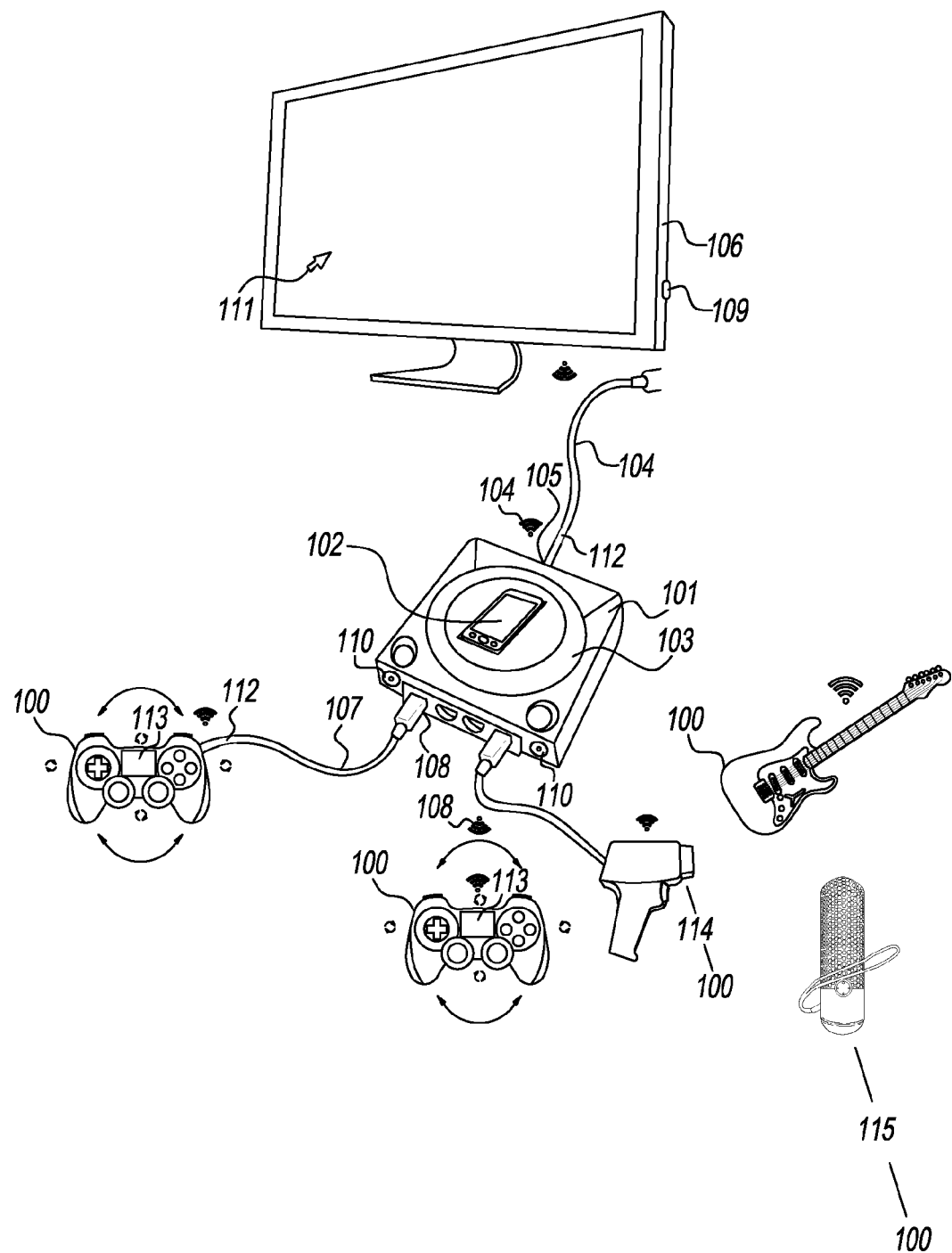
FIG. 1 is an illustration representing a constituent disposition, in accordance with an embodiment, of a video-game console for touchscreen devices in an acting manner of assimilation. The touchscreen device itself, as a case in point, may act as the external media of the video-game console for allied touchscreen devices.

A touch screen is a computer display screen that is also an input device. Said touchscreen display screen, as its name would suggest, is sensitive to contact; a user primarily interacts with the computer by touching actionable images or characters being rendered on the screen and by manipulating its sensor inputs as it is grasped. Recognized input methodology across the various touchscreen technologies is, of course, technology specific.

Surface wave technology uses ultrasonic waves that pass over the touch screen panel. When the panel is touched, a portion of the wave is absorbed. This change in the ultrasonic waves registers the position of the touch event and sends this information to the controller for processing.

With resistive touchscreen technologies, for example, the touchscreen panel is comprised of several layers; notably two electrically-conductive membranes that are typically separated by an extremely thin non-conductive gap. When pressure is applied to the flexible topmost layer, contact is made with its conductive pairing below it, effectively completing "a circuit" at the point of contact and thus, engaging the hardware for specific coordinate-data determination and related processing.

In a capacitive-sensor system, the touchscreen panel, typically glass coated with a material such as Indium-tin oxide to enhance conductivity across a sensor device, acts as a sensor. In preamble, a biological property of the human body is its ability to carry and store an electrical charge—a case in reference being the electrons contained in your finger. The capacitive-sensor system utilizes a conductive input, usually a user's finger, to register touch and is ideally capable of collectively tracking 10 or more fingers concurrently. Finger contact with the capacitive-based touchscreen panel alters its electrostatic field, which is then interpreted by the processor and device's software, translating this touch into a gesture or command. Respective capacitive touchscreens feature electrostatic-field monitoring circuitry, with points that can be arranged in the form of a grid. Each point on the grid is designed to register changes in electrostatic fields and process them accordingly, making multi-touch and multi-gestures possible.

Display and various technology manufacturers worldwide have acknowledged the trend toward acceptance of touchscreens as a highly desirable user interface component and, as such, touchscreen UI's are being increasingly integrated into the fundamental design of an increasing array of electronic products.

Embodiments herein are directed to methods and assemblies for the creation of a touchscreen-based video-game console that receives a removable touchscreen device for the allied purpose of creating a familiar delivery platform for the remote actuation and/or manipulation of a touchscreen device's actionable inputs, including its input Sensor APIs and those graphically-based (digital renderings seeking the control input of a finger); with an embedded application serving as the external media. The present invention seeks serviceability with all sensor APIs (e.g. a hardware-input sensor, such as, but not limited to, a tilt sensor integral to the delivery of tilt-based games) of varying touchscreen devices, including applications involving a coalescence of sensor types and the implementation of a serviceable mapping system to programmatically leverage their use. The disclosures herein are provided to lend instance to the operation and methodology of the various embodiments and are neither intended to suggest limitation in breadth or scope nor to suggest limitation to any appended claims. Furthermore, such exemplary embodiments may be applicable to all suitable touchscreen technologies, beyond capacitive and capacitance governed, such as those inclined with resistive touchscreens that, too, respond to touch input—albeit with its own peculiarities related to the technology. Those skilled in the art will understand and appreciate the actuality of variations, combinations and equivalents of the specific embodiments, methods and examples listed herein.

Although not suggestive of limitation, portable or mobile touchscreen devices such as smartphones, tablets and wearable computing are the preferred counterpart choice of coupling or allied integration with the video-game console for allied touchscreen devices in a gaming environment; again, exempli gratia, serving as the present invention's external-media, at least in accordance with the accompanying illustrations. The present invention teaches how a touchscreen device equipped with built-in applications such as, but not limited to, gaming apps can find its actionable content highly assimilated into the described delivery platform unique to its teachings. Further heightening the gaming experience for the user, touchscreen devices may also be equipped with Internet access in allowing gamers to take their skills for adversarial competition online without facing many of the traditional constraints associated with touchscreen gaming. The touchscreen device typically runs a myriad of free and paid applications, many of which are conveniently downloadable via said Internet capabilities of the device.

By way of example and not by limitation, the touchscreen device may offer its user the use of digital voice services and calling features, text messaging, e-mail and web-browsing capabilities, still and video cameras and a MP3 and video player adding to its multimedia fodder. Additionally, the touchscreen device may include a connection interface that, exempli gratia, permits users to sync data with their computers and update their smartphone software.

DETAILED DESCRIPTION: FIGURE SPECIFICATION

Referring now to the present invention more precisely, in accordance with an embodiment, FIG. 1 represents four primary components of the video-game console disposition for allied touchscreen devices: 1) a wired and/or wireless remote controller input 100; 2) a central video-game console 101 that pairs with an allied touchscreen device 102 and an omnidirectional base 103 that potentially houses said allied touchscreen device 102 and is designed to mechanically reproduce—in a correlative manner; a reflex manipulation under certain mechanically-inclined operating environments—the motion-based influence 113 of a remote controller input 100 on an allied touchscreen device 102 mounted thereon; and a video-game console 101 disposition, by way of example, and not limitation, responsible for interactive processing and fruitive delivery of both actionable and non-actionable content remotely; 3) the allied touchscreen device 102 serving as, exempli gratia, the external media and input and output dynamic; and 4) a wired and/or wireless means of a live (AV) output 104 of said engaged external media device.

Figure 10:
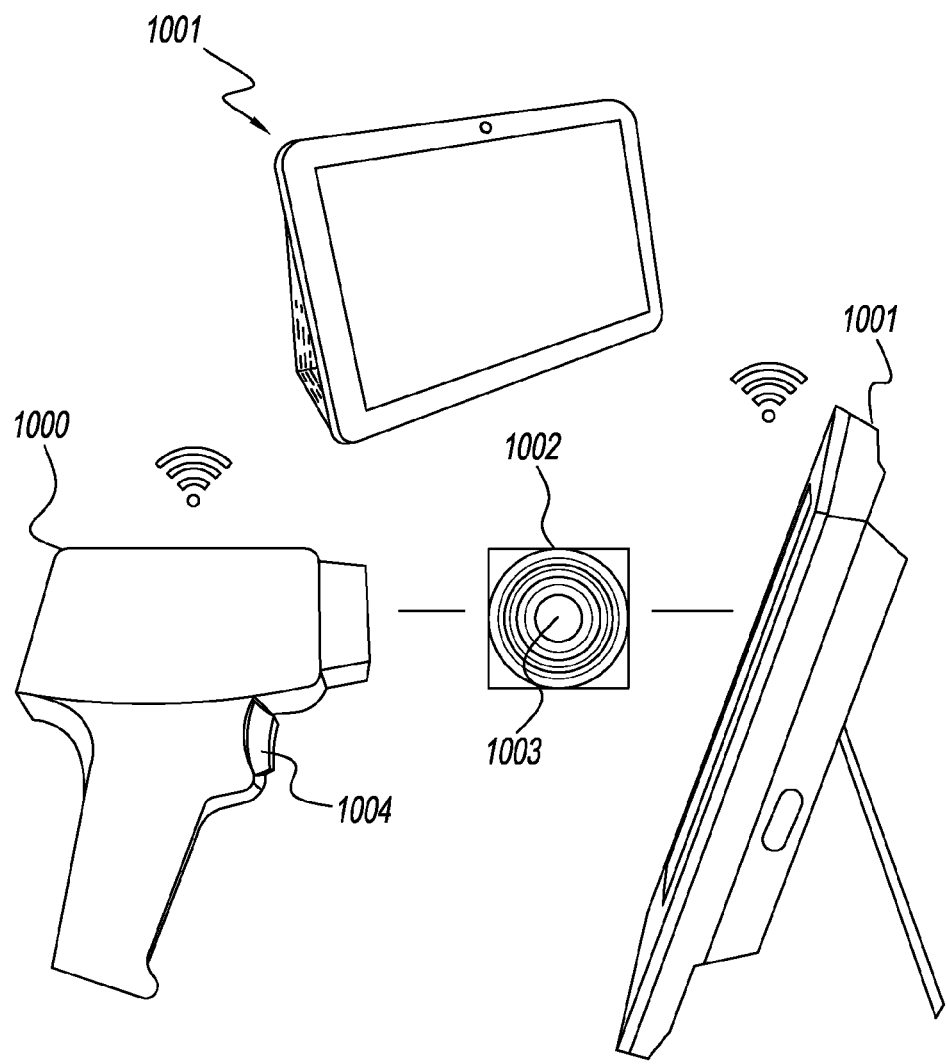
FIG. 10, in accordance with an embodiment, illustrates a plurality of light-gun or akin-based specialty-input controllers mobilized for remote control of an actionable input such as, but not limited to, an actionable object on a receptive touchscreen user device while allied to a gaming console assembly and/or when being used independently thereof.
Figure 11:
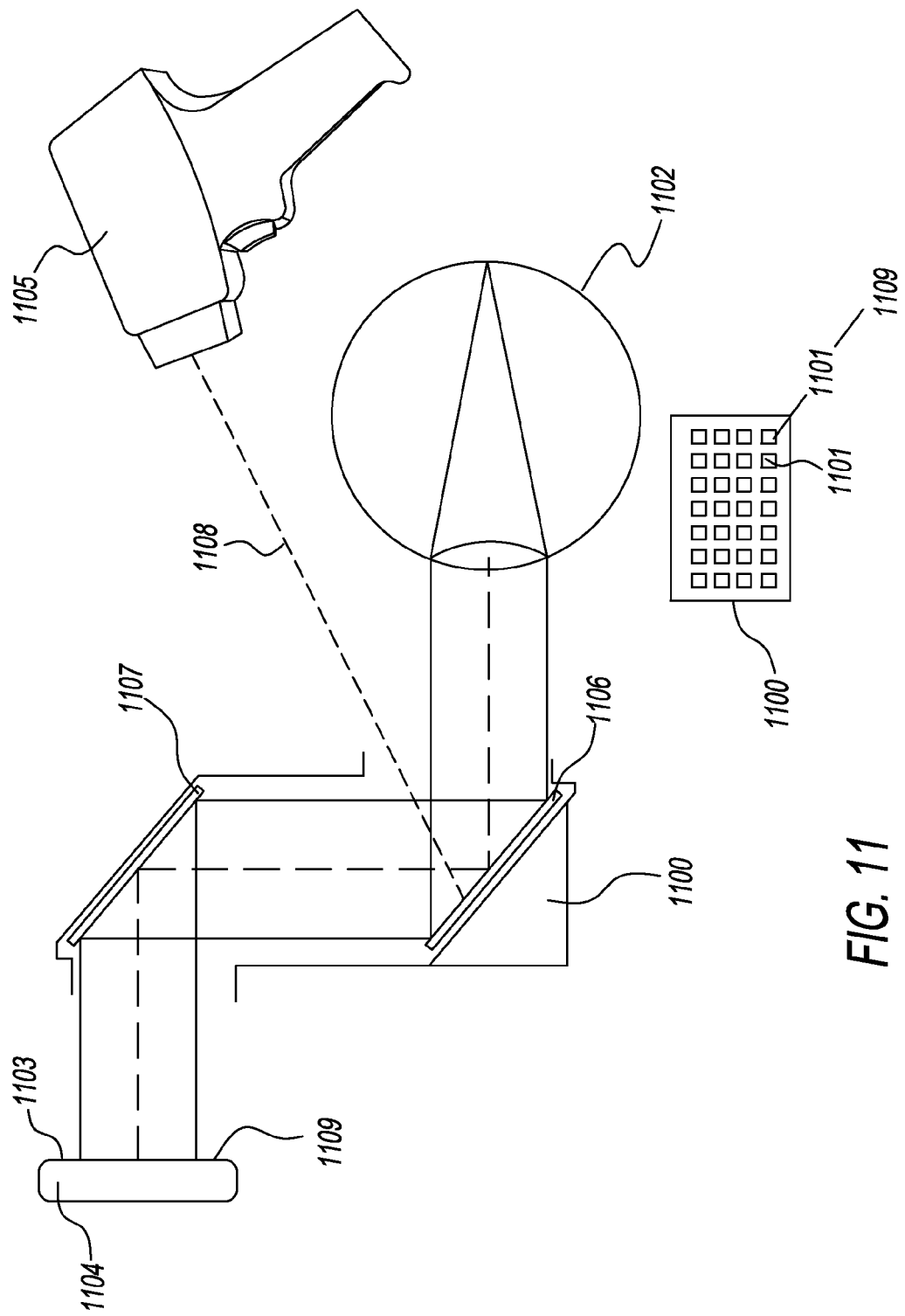
FIG. 11 shows a touchscreen user device oriented such that its broadcast image thereon is reflected by a relay mirror strategically positioned for both receipt and subsequent reflection of said broadcast image to an acrylic-mirror counterpart concluding a reflection chain, where the resulting reflected image is the same as the original broadcast image and not reversed. Below the surface of the acrylic mirror is a receiving device comprising a grid of photodiodes which can detect infrared light (passing through the acrylic mirror) projected from a broadcast source such as a light gun. Thus, a user may view and shoot light beams at the acrylic mirror (rather than the touchscreen itself) with the same coordinate precision for purposes of, by way of example, and not limitation, manipulating an actionable object in a gaming console 101 environment.

The video-game console 101 component of the video-game console 101 with allied touchscreen device 102 can both manage and integrate directives of both a remote controller input 100—including use of a specialty-input controller 100 such as, but not limited to, a rumble guitar controller 100, lightgun controller 114, FIGS. 10, 11 as illustrated and motion-input or gesture-sensing controller 115—and a touchscreen device's AV output 104 interface (for live output) in relation to a running application and/or actionable content platform on the touchscreen device 102. The remote controller input 100, as the exemplary figure suggests, is connected to the video-game console 101 of the present invention by virtue of a serviceable wired and/or wireless connection for nimble operation. The live AV output counterpart, its fixed interface 105 preferably positioned nearest the output display device 106, is also serviced by a wired and/or wireless tether 104 from the gaming console 101 with allied touchscreen device 102 to the output display device 106 present in the operating assembly. This process of tethering may be automated using such technologies as, but not limited to, NFC in concert with Miracast (an exemplary screen casting standard) as a touchscreen device 102 is placed in proximity to the video-game console 101. A video-game console 101 may also automatically sync with a remote controller input 100 and manage administration of a serviceable mapping interface based on said NFC trigger of a proximal touchscreen device 102 and its running application. An automated process of wirelessly pairing all communicable console-related components (e.g. for use with a respective selection of an external media title) upon a proximity-associated trigger event being both an exemplary and game readying feature.

Figure 8A:
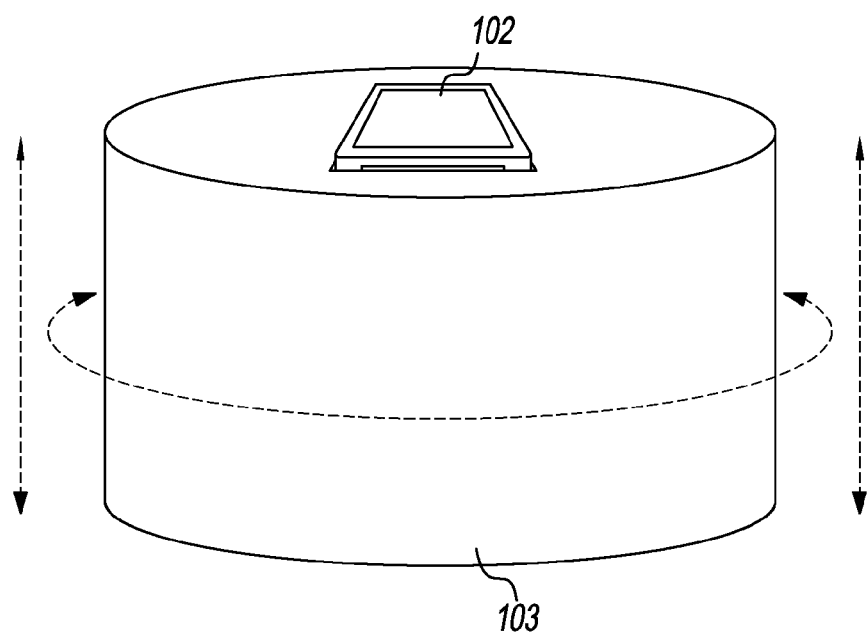
FIG. 8A, in accordance with an embodiment, represents an omnidirectional-base component (a serviceable omnidirectional platform responsible for both stationing and influencing an allied touchscreen device mechanically) of a video-game console for touchscreen devices.
Figure 8B:
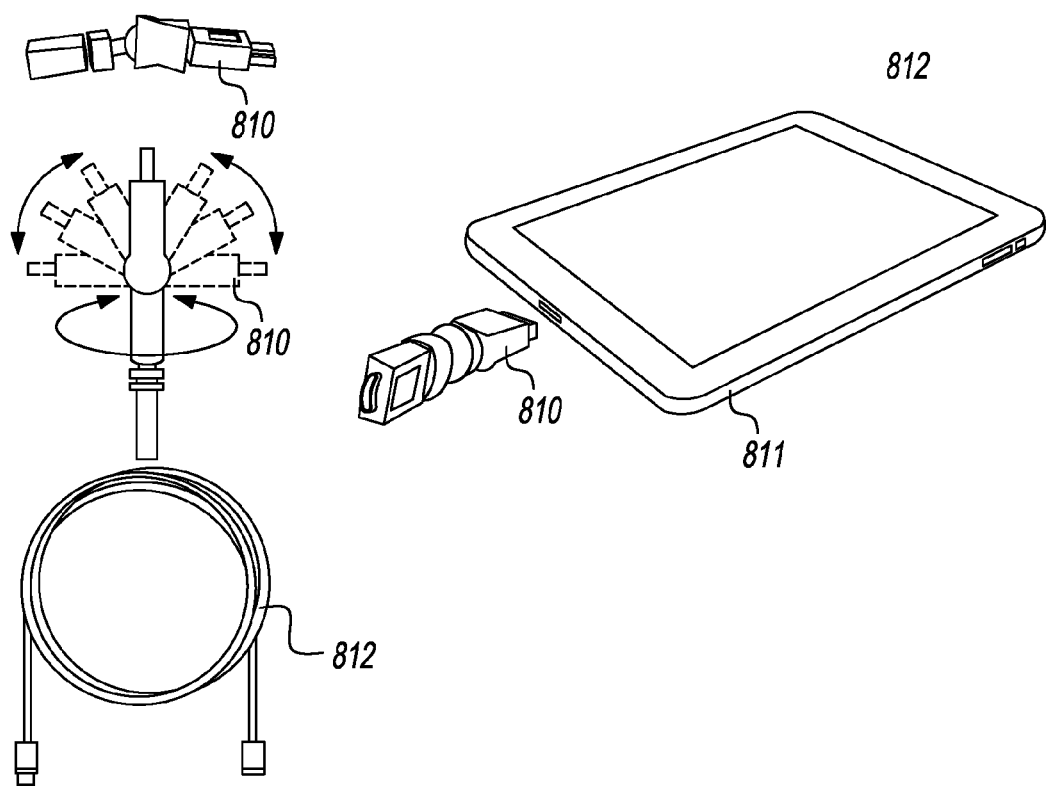
FIG. 8B, describes an anti-twist connector apparatus designed to help prevent wire twisting and for attachment to a manipulable device, such as a touchscreen device under the mechanical influence of an omnidirectional-base, this in accordance with an embodiment.

Each respective tether extending externally 104, 107 from the video-game console 101 with allied touchscreen device 102, may find its correlative (secondary) wired and/or wireless tether (e.g. the respective tethering extending internally of the video-game console 101 unit's physical structure, see FIGS. 8A, 8B for related discussion and FIG. 8B for an exemplary wired intermediary-cable tether) ally itself with the allied touchscreen device 102 on one side of the console (e.g. the output side), respectively, and an input connector interface 108 that connects to, according to a serviceable example, an attachmentless-transceiver device 300 (See FIG. 3) on the other (e.g. the input) side of the console; thus serviceably linking, without suggestion of limitation, the four primary components cited above.

For controller environments without use of an attachmentless-transceiver device 300, in a non-illustrated suggestion of potential diversity by digressive example, a capacitive-based input controller—one that may be powered exclusively by the capacitive throughput of a user's fingers—may see each of its applicable output elements affixed directly to the correlative soft interface of a mounted touchscreen device by suction, static, a gummy interface, removable adhesive backing, from a manipulable extension such as that found on a touchscreen case and/or any other appropriate means, in acting as an input modality. In a hybrid implementation of the noted capacitive-based input controller above, a touchscreen controller may be at least partially comprised of a conductive material such that it sufficiently permits for a serviceable conductive path to be engaged and transferred from a user and unto a touchscreen surface for the engagement of an actionable object upon application. How it differs from the exemplary capacitive-based input controller is that under a hybrid integration, the capacitive or hand-held controller is additionally equipped with a microcontroller, battery source, wireless interface, and at least one vibration motor for haptic ability and other germane electronics, including potential use of any serviceable proprietary technology, that may be incorporated for the intent and purpose of communicatively manipulating a touchscreen device's actionable inputs by both attachable capacitive engagement and non-attachable (at least in a physical sense) electronic association of a hand-held controller with said touchscreen device.

As suggested above, use of an attachmentless-transceiver device 300 is not requisite to a console's operating assembly, as a serviceable mapping protocol may occur by virtue of the direct virtual pairing of an input controller and a touchscreen device with mapping interface and/or with the console acting as an intermediary device. In an intermediary role, exempli gratia, technologies such as, but not limited to, NFC may further be employed such that as an allied touchscreen device 102 is placed in proximate association with the gaming console 101, a mapping interface for the given external-media content is automatically activated by the gaming console 101 (e.g. with said mapping interface recalled based on a previous stored-configuration event associated with the launch of a gaming title or in presenting the user with an option of configuration in the immediate controller environment—and for a subsequent internal-memory storage event that occurs—thus, automatically facilitating a mapping interface for a given gaming title going forward). Furthermore, under an operating environment whereas the gaming console acts as a robust intermediary device, said console may readily integrate more than one input controller into a single gaming environment, concurrently, hence making multiplayer mode possible for serviceable titles. For example, in an air hockey game with two virtual paddles displayed on opposite ends of the touchscreen, each user may use their own individually mapped touchscreen controller (see FIG. 6A 601, 604) to control their respective virtual paddle. Certain restrictions to the controller may also be imposed in multiplayer environments, where coveted, although this is not suggestive of limitation. A restriction may be placed, exempli gratia, where a user may only be allotted control of half the touchscreen—that is, the half where his or her paddle directly operates. In accordance with this exemplary discourse, an allied touchscreen user device 102 may be controlled by a corresponding software module and/or module plurality under the provisioning of a controller input influence and in association with a microcontroller assembly.

A software disposition may be fundamental to the described mapping interface and may further serve an auxiliary purpose of augmenting the external media; an example of this may include the internal-memory storage of a saved game for continuation later and/or the saving of high scores for a gaming title (that may be readily recalled in a NFC-triggered environment). In this way, as an allied touchscreen device 102 is placed in NFC-based proximity with the gaming console 101, the salient metrics to a gaming environment, including those spanning beyond the fundamental rudiments of juxtapositioning a correlative mapping interface for serviceable engagement, may be automatically and serviceably synched under the management of the console (with said metric deployment, exempli gratia, contingent upon an external media selection). An analogous NFC-triggered event, in further exemplary discourse, may see the gaming console 101 present the user with an actionable menu display system (e.g. upon proximity association, a system that presents a compiled list of embedded applications—such as, but not limited to, a listing of games located on an allied touchscreen device 102—that a user may select from and engage with a controller input device, remotely). Control of a touchscreen user device 102 and its user interface, remotely, by virtue of a manipulable pointer invoked upon proximity association, adds yet another serviceable instance of a console-born trigger event to the present discourse. Automated mapping of an engaged (embedded) application based on a proximity-associated event being an invocation agent that serves to expedite commencement of game play in accordance with a further example still.

Returning again now to the figure. Addressing potential iterations of the remote input controller 100 first, more particularly in relation to its interaction with the gaming console 101 component in the controlling (manipulation) of an actionable input on a touchscreen device, the discussion begins with yet another example of a hybrid iteration, without suggestion of limitation. A wired input controller 100, exempli gratia, may be directly connected (e.g. plugged in) to an input connector interface 108 of the gaming console 101 component. An internal (of the gaming console) extension from the input connector interface 108 to an actuating interface of the touchscreen device 102, allied with the gaming console 101, may occur by any serviceable expression. By way of example, and not limitation, an actuating interface may be supplied by an attachmentless-transceiver device 300 (See FIG. 3) in tether association (e.g. under a microcontroller influence) to the input connector interface 108, preferably wirelessly in a preventative measure to avoid the potential for physical wire kinking; as the attachmentless-transceiver device 300 is fully chargeable and prone to omnidirectional manipulation upon superimposition with a mounted touchscreen device 102 sitting securely stationed on an omnidirectional base 103. An intermediary-transceiver device, exempli gratia, one that is associated with an overlay and junction socket (FIG. 4) is, of course, also a serviceable example. Wireless expressions can require a serviceable mapping system; each readily assimilable into a controller environment of the present invention. As suggested above, a remote input controller 100 may, of course, also wirelessly connect directly with a touchscreen user device 102 in certain iterations; whereas the gaming console 101 component may still remain concurrently connected directly with the remote input controller 100 for a variety of engagement duties including, but not limited to, continued and correlative mechanical (reflex) influence of such actionable inputs as a touchscreen device's 102 input sensors.

Addressing now a potential wired iteration, without suggestion of limitation, of the video-game console 101 with allied touchscreen device's 102 live output tether 105 counterpart, the built-in output connector interface 105 of the gaming console 101 component is serviceably tethered by an internal intermediate cable (see FIG. 8B) seeking attachment of its opposing end with the matching interface of an allied touchscreen device 102, thus engaging the live output tether 105 counterpart upon connection. Upon serviceable connection, a Component and/or Composite AV extension cable or Digital AV adaptor, such as an HDMI AV cable, without suggestion of limitation, is then permitted to extend at a corded length 112 from the output connector interface 105 of the gaming console 101 with allied touchscreen device 102 to the output device 106, often comprising an HDTV 106 or Ultra HDTV including those units 3-D equipped and a PC monitor, via a serviceable AV interface 109 supplied by the output device 106. The delivery of live output thus originates by virtue of the internal tether or intermediary cable connected to both the touchscreen device 102 (source) and the connector interface 105 end that is internal to the video-game console 101 and becomes engaged in operation by active cabling of its external 105 counterpart. Bi-modal integration with Virtual Reality (VR) headsets may add to live-output options, as the VR technology becomes more popular with consumers.

Pressing on further, in discussing the connector interface 105 end that is external to the video-game console 101, as a Component and/or Composite AV cable 104 or Digital AV adaptor is serviceably and actively inserted, a user may thus be afforded generous positional fluency of the video-game console 101 with allied touchscreen device 102 from an output device 106. In a wholly wireless assembly, of course, which may be a preferred disposition, any serviceable method of wirelessly pairing the four primary components (as cited above, including any and all connector interfaces) of a video-game console disposition for touchscreen devices may be employed for the purpose of manipulating an actionable object or object plurality and/or the manipulation of an actionable input (e.g. an actionable sensor input; not the subject of detailed illustration and discussion as per this embodiment, the reader may refer to FIG. 6A for more detailed discourse on the wireless manipulation of a remote sensor).

Referencing the gaming-console 101 component specifically, that is the component less the assimilable (allied) touchscreen device 102, in a further example not suggestive of limitation, the console 101 may comprise an assembly of components—not all under the subject of illustration—such as, but not limited to, a processor or processor plurality enlisted to process actionable-related duties (e.g. responsible for processing a remote act of manipulation of a touchscreen input by a user), an innate capacitive source and manager seeking actionable integration by virtue of a physical actuating interface that may be coveted in certain operating environments, a virtual mapping system and a wired and/or wireless interface for bi-modal (receipt/transmission) or communicable interaction with, exempli gratia, integral hardware such as an input controller device 100, an allied portable touchscreen device 102 serving, in part, as the external media and/or an output display interface 106. It may further comprise such features as, to add colour by example, a voltage and/or current-based power assembly, a charging interface, a digital-media receiver component supporting streaming services (both subscription-based, pay-per-view and free services including Internet TV), a high fidelity stereo Bluetooth link, a FM transmitter, noise-elimination technologies (e.g. benefiting voice command input and VoIP applications), at least one projection device capable of high-resolution projection to a projection screen or projection-screen plurality strategically placed to add "visual depth" and immersion to a user's visual environment (e.g. Provisional Patent No. 61/702,721 FIG. 9B) and/or projection to the serviceable surroundings of a room's determined topography, a kindred 3-D holographic projection device, a VR interface, at least one camera 110, at least one communal sensor apparatus for gesture-based recognition integration (e.g. a depth-sensor apparatus 116), internal storage memory, a USB or like interface, flash card and/or flash device support, one or more removable media interfaces, an Internet-connection slot, the presence of all serviceable wireless radios and/or a manipulable physical apparatus 103 (e.g. a servo and/or gimbal structure capable of mechanical movement in all salient directions, with the servo and/or gimbal structure potentially comprising, more particularly, an omnidirectional base capable of the mechanical influence of an allied touchscreen device 102 and its correlative input [electronic] sensors by associative influence. The omnidirectional base 103 being housed in a video-game console 101 in accordance with an embodiment, see FIG. 8A.

Input sensors may include, but are not limited to, accelerometer, ambient temperature, compass, gravity, gyroscope, light, linear acceleration, magnetic field, orientation, pressure, proximity, relative-humidity, rotation vector and temperature; where being germane to an embedded application (e.g. a game's controller metrics). The reader notes that such positional "influence" of sensors, as readily understood by the inventor's teachings, can also be electronically "induced" (by virtue of a method and assembly that is wholly software based or virtual in nature)—that is, the input sensors need not be mechanically influenced in accordance with a variant operating scenario—under the adroit stewarding of a correlative mapping interface. And while a gimbal and/or servo structure is noted in this exemplary discourse when suggesting a possible drive system of an omnidirectional base, the expression, as suggested, comes without suggestion of limitation.

With an emphasis on camera-based tracking as an integral form of input, the discourse now returns to the one or more camera(s) 110, powered by both hardware and software, for an extended discussion of the potential tracking and communicating of a trackable input such as an input gesture (the reader may refer to FIG. 9 for related discussion) and for the incorporation of augmented reality into a console theme 101 for allied touchscreen devices 102. Prior art describes a sensor system involving 3D depth sensors, a RGB camera and a multi-array microphone for voice-recognition functionality. By projecting a laser across an entire play field, the 3D depth sensors, in association with an infrared (IR) camera, for instance, permit the tracking of a user since the RGB camera is capable of detecting and grading IR noise (with a varying-colour disposition) in a living room environment in order to establish the proximity of a user to the sensor device based on said colour grades. Filters are then applied to convert this information into a skeleton with moving joints in real time. The present invention may serve to transition the dispensation of an akin sensor system as a modal input—such as any system serviceable to the efficient input-metric determination of the prior art noted in this paragraph—to a touch-screen environment generally and more particularly to an environment comprising a customized video-game console 101 for conciliatory operation with an allied touchscreen device and its actionable content under the governance of a serviceable mapping system and in the spirit and scope of this discourse.

Building further now on the initial discussion of a specialized input controller adapted for touchscreen devices as above, the inventor further wishes to disclose an exemplary and unique specialty-controller for touchscreen gaming in order to augment the disclosure of the present invention—in a suggestion of practical diversity—and to add depth to the inventor's specialty-controller portfolio. Without illustration and a suggestion of limitation, a unique bicycle controller for use with touchscreen devices is described. The reader may visualize the pedal-based cycling exercise apparatus of the local gymnasiums for a general physical intimation of the structure of said bicycle controller for touchscreen devices; with the preferable exception of the build grade being retrenched for the described controller scenario (e.g. with a smaller, more lightweight and manageable footprint for a living room environment) and also the handle bars being steerable.

The base of the bicycle controller for touchscreen devices may be inclined to moderately pivot to afford the user added realism upon engagement and may further be equipped with, along with the bicycle-controller components, haptic ability to, exempli gratia, subject the user to "impressions of a changing terrain" (such as when a cyclist commences traversal of a bumpy road). More particularly, the bicycle controller for touchscreen devices is embedded with an electronic interface that permits the tracking of user-based input metrics including, but not limited to, angular balance and directional inclination, a selected gear ratio, pedal count, including the monitoring of speed and RPM to, exempli gratia, assess the distance being travelled for fluid integration into an evolving digital terrain or virtual environment being displayed on a remote touchscreen and the respective body mass of a user. Simply described, a user may be initially prompted to enter select data and to select a place on a virtual map displayed on an allied touchscreen module of the gaming console 101 assembly and upon engagement of the bicycle controller for touchscreen devices, the embedded application of the wireless module—in its commutative or wireless association with the bicycle controller—services the evolving digital terrain by virtue of updating and displaying the rendering accordingly.

Said differently, under serviceable operating scenarios, the virtual surroundings of the user-selected place—prone to an evolving display on a touchscreen device—are updated instantly to account for the course of travel based on the user or cyclist's input metrics (pedal count, including road-grade consideration, direction, distance travelled; etcetera) being capably tracked by the bicycle controller, video-game console 101 and/or the allied touchscreen device for operational integration. With the embodiment's propensity for seamless assimilation into a video-game console 101 environment for touchscreen devices 102 being obvious. More difficult user settings selected at start up may, logically so, accompany more difficult virtual road conditions being displayed on the touchscreen (such as when hill travel predominates a "run" on a user selection of higher difficulty levels). Such conditions may be concurrently replicated, of course, by both the bicycle controller (e.g. with a greater disposition of resistance produced by an internal mechanical assembly to simulate hills) and the virtual display accounting for the active conditions.

The user may, in an alternate iteration, also base the travelling environment on a selected model of real-world displays both generated and stored in a cloud-based and/or internet-database environment (based on input metrics, the user travels in a dynamically updating photographed or recorded environment to add a sense of visual realism or a "street view" for an engaged cycling tour). Panoramic views may also be possible under serviceable controller bases and/or when a camera-based tracker is incorporated that monitors, exempli gratia, a user's visual and headward disposition under methods such as the generation of a dynamic three-dimensional image of objects in its field of view and to recognize the user or cyclist as the primary movable object (in contrast to the static objects) for adaptive digital integration. Furthermore, the controller assembly may comprise a sonar-based apparatus and/or serviceable equivalent capable of measuring both depth and dynamic influence for transition of the manipulation of this specialty controller to a touchscreen environment. Therefore, under the present invention, influence on a mechanical base and/or a tracking agent such as a digital camera may lead to the fluid corollary manipulation of a digital environment (such as when a user leans to turn, raises from the seat to muster pedal intensity, takes a sip of water, etcetera, all of which can be readily translated to gestures of a digital cycling figure on the touchscreen).

Furthermore, the user may leverage wearable controllers, such as an arm band, that incorporate technology to dynamically track the pulse, heart rate, sweat (with sensor technology built into the band) and breathing rate of the user under acoustical influence, with such gathered data transmitted to a touchscreen device for dynamic updating, where so coveted, in a controller environment of the present invention. Such sensor technology may, of course, also be embedded into the hand grips of the bicycle-controller apparatus. And under advanced mapping systems, in a further suggestion of breadth, a GPS sensor inherent to an allied touchscreen device may be virtually mapped under an embedded application; such that sensor-based and non-sensor based input metrics of the bicycle controller may be transmitted to, and processed by, an allied touchscreen module for serviceable GPS-based digital integration in real-time while the bicycle controller remains stationary. As the cyclist is determined to have "travelled" one mile in a northwesterly direction (the direction could be ascertained under many different metrics, including a divergent iteration with directional handle bars that transmit directional inclination in association with pedal metrics), for instance, a GPS-based system may process all salient input metrics of the bicycle controller and cause the results to be "streamed" to a digital environment instantly during the entire course of "travelling" said 1 mile (and beyond); peddle-for-peddle based on said processed input metrics. Stationary travel is thus transitioned to an evolving virtual environment just as if the user was influencing the GPS device through actual travel; thanks to the advanced mapping capabilities of the controller interface described by the present invention. Advanced mapping capabilities may, as an example, additionally utilize an internal-memory storage event, as advanced by the intermediary console 101 device. Such an operating environment may, in a non-limiting suggestion, appeal to trail-blazing adventurers, gaming enthusiasts and long-distance athletes undergoing core strength and conditioning training. Moreover, the described specialty controller could be readily adapted for such activity as, but not limited to, snowmobiling, dirt-bike racing and even skiing in a suggestion of controller breadth of possibility.

Figure 2:
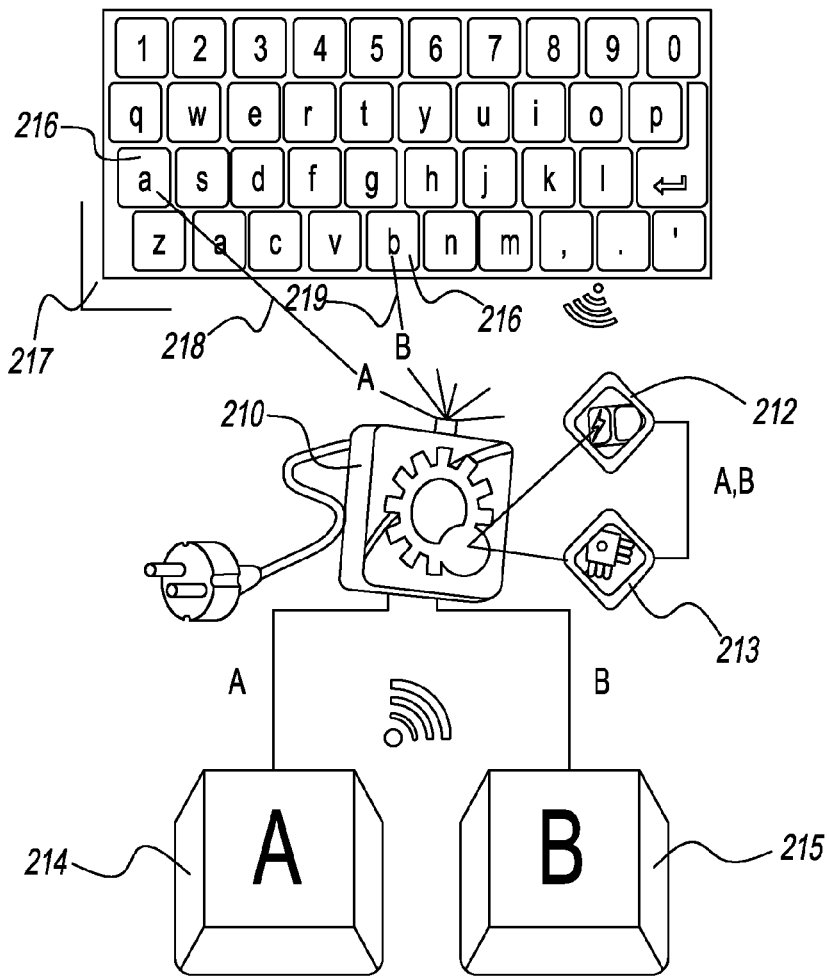
FIG. 2 is an elementary view of an intermediary-transceiver device, this in accordance with an embodiment.
Figure 2:
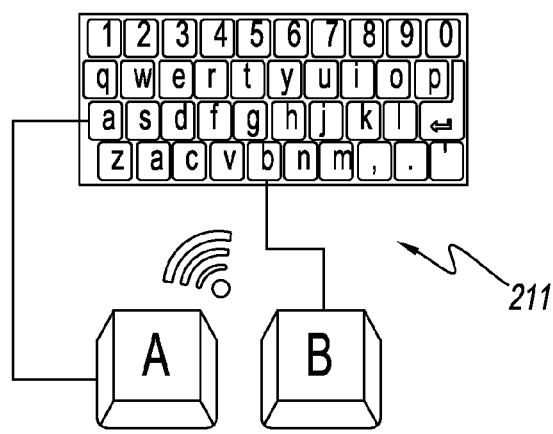

FIG. 2 represents an elementary and embodying view of an intermediary-transceiver device that, exempli gratia, leverages an innate-capacitive source and capacitive manager to faithfully engage—through a network of actuating agents (e.g. conductive paths comprising the requisite channelling and elements for capacitive discharge in response to a controller input or input plurality) upon attachment to a touchscreen surface—an actionable object or object plurality rendered on the touchscreen of a portable or stationary device. Potentially replacing the need, where coveted, in congruence with the input dynamics of a touchscreen device and running application, for a software-based mapping system under remote operation scenarios involving a controller input. That the elementary principles of this device may be serviceably assimilated into a gaming console 101 with allied touchscreen device 102 described in FIG. 1 (and at the heart of the present invention), being obvious.

To facilitate reader understanding, before more advanced disclosure of potential intermediary-transceiver device assimilation into a gaming console is articulated, FIG. 2 will serve as a preamble embodiment to reflect on a core of basic principles of an intermediary-transceiver device. To begin, an intermediary-transceiver device 210 is designed to leverage an innate-capacitive source 212 and capacitive manager 213 to correlatively engage—through, exempli gratia, a prescribed network of actuating appendages (e.g. an attachable ramifying wired interface) and/or a network of articulated conductive paths (e.g. an attachable ITO-based overlay, see FIG. 4) seeking correlative attachment to a touchscreen—a plurality of actionable objects, in this case the perspective letters "A" 214 and "B" 215 on the touchscreen of a portable or stationary device. Designed in accordance with the input dynamics of a touchscreen application, this device can supplant the need for user supplied capacitance, or put another way, removes user-supplied capacitance as a requisite component in the realization of an engaged conductive path—from its engagement to its actuating conclusion—in the spirit and scope of this discourse.

In a rudimentary brush stroke, the intermediary-transceiver device 210, either in a wireless (e.g. where a mapping system or virtual interface may be employed to virtually engage a soft input, not the subject of the current illustration) or wired environment, acts to mediate a control input. That is, in reference to a physical interface, to "mediate" an elementary conductive path from its inception to an actuation-based conclusion. As the diagram inset 211 shows, an elementary conductive path may comprise a control input A,B, remotely situated, as it is correlatively paired with a control output A,B (that is, a physical interface that outputs capacitance to the respective A,B soft-button inputs on a touchscreen). Those skilled in the art will appreciate that a conductive path may be prone to influence by a wired and/or wireless tether and, as suggested, a physical interface may be wholly supplanted by a virtual interface where coveted: for instance, one that is purveyed by a video-game console's 101 wireless interaction with its allied touchscreen devices 102 in the collaborative manipulation of both actionable objects and actionable inputs.

The intermediary-transceiver device 210 contains an innate capacitive source 212 and capacitive manager 213, particularly for controller environments reliant on physical (and not virtual, software-based) mapping. That being said, depending on the operating environment of choice, the intermediary-transceiver device 210 may still serve as an intermediary without reliance on an innate capacitive source and/or manager as it operates in a wholly wireless state serving input directives to a portable or stationary touchscreen device 217 paired with a serviceable virtual mapping interface (not the subject of illustration). As a plurality of control inputs are engaged or manipulated remotely, such as with the letters A 214 and B 215 in respective order, this string of sequential input directives is directed—either wired or wirelessly—to an intermediary-transceiver device 210 for related processing. The capacitive manager 213, faithful to input chronology of the originating input source, leverages an innate capacitive source 212 to inject an incidence of capacitance, where necessary, to each wire A 218 and wire B 219 (or like correlative conductive path), acting as a control output (or capacitive output) in transmitting a capacitive charge to a respective soft-button input counterpart in an actuating conclusion (the "discharge").

Figure 4:
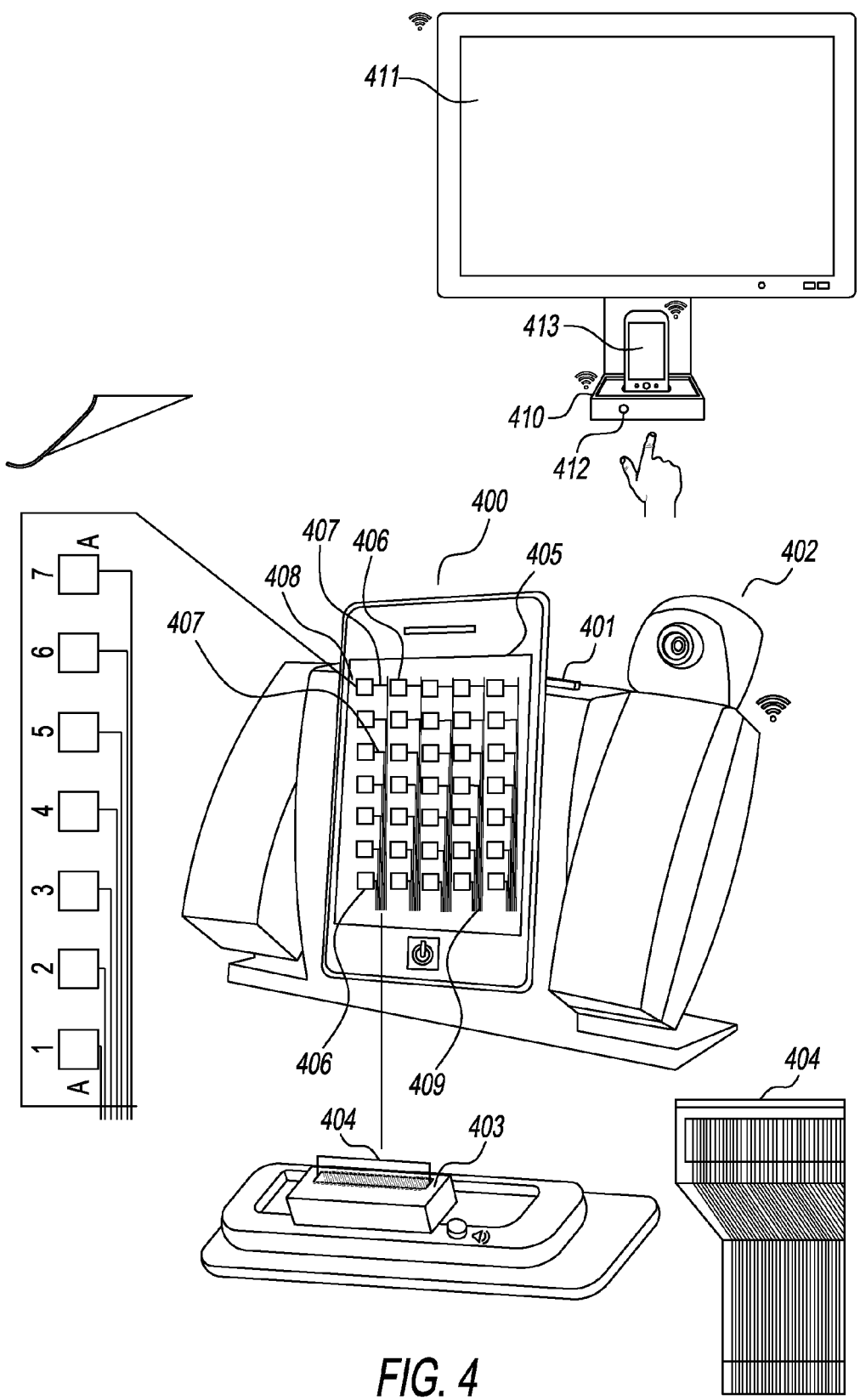
FIG. 4 illustrates a method and assembly, in accordance with an embodiment, of strategically deploying a capacitive charge or charge series, by virtue of an attachable overlay, to the receptive touchscreen of an allied touchscreen user device 408; the potential for integration into a gaming console 101 with allied touchscreen device 102 being obvious.

As the capacitive charge is relayed, respectively, to the soft-buttons 216 of the touchscreen of a portable or stationary device 217 through, exempli gratia, a wired network of attached elements (or of serviceable conductive paths such as, without suggestion of limitation, the inciting of an element tethered to a conductive channel in a coated-conductive network discussed in a varying embodiment, see overlay attachment FIG. 4), an actionable object is correlatively engaged. While such attachments are not the ardent focus of depiction in the figure, they are understood from the teachings under common ownership of the inventor and incorporated by reference herein. To summarize then, in accordance with an embodiment, the control input A 214 is relayed to the correlative soft-button 216 by wire (or serviceable conductive path) A 218, in a manner faithful to an input sequence to which it originated. Similarly, the control input B 215 sees the intermediary-transceiver device 210 relay an instance of capacitance to the correlative soft-button 216 by wire (or serviceable conductive path) B 219; the wire (or serviceable conductive path) which is correlatively attached to a point of contact, through any serviceable means, to the "b" soft button 216.

A stand-alone intermediary-transceiver device 210 equipped with a built-in camera or camera plurality was disclosed by the inventor in U.S. Provisional application Ser. No. 61/499,1002—filed on Jun. 20, 2011 and incorporated herein by reference—and describes a device that may facilitate motion determination for purposes of mapping engagement or in the management and sharing of images or a live feed across a network (for instance, to an online community and/or gaming portal) and may be fully functional as an Internet-enabled device with hub disposition; thus being ideally suited for a user to engage in surfing, media viewing, online gaming (e.g. app stores and popular play websites; extending social-gaming environments involving multiple-players), in naming only a few possibilities. The potential exists for functional incorporation of such a device or a subset of its features into a gaming console component due to the potential for considerable operational overlap. As the focus of this particular figure is on a stand-alone intermediary-transceiver 210 in an introductory sense, the reader further notes language suggesting that an intermediary-transceiver device 210 may also be equipped with auxiliary components such as, but not limited to, a headphone jack, microphone jack (and/or a built in hardware complement), speaker jack (and/or a built in hardware complement) and to offer two-way communicative capabilities, providing for potential user interaction with online gamers during the course of gameplay, the input of a voice command and/or for VoIP telecommunication and teleconferencing, as examples. These additionally mentioned features, along with its full functionality and feature swath, also being easily integrateable into the present invention of a video-game console for an allied touchscreen device. An intermediary-transceiver device 210, exempli gratia, upon assimilation into a video-game console for allied touchscreen devices will yield a console device capable of furnishing both physical or "virtual capacitance" to the allied/coupled touchscreen device (although the presence of such an intermediary-transceiver device 210 is not requisite for the furnishing of "virtual capacitance" in a mapping system that may be accomplished through a variant and serviceable electronic assembly).

Figure 3:
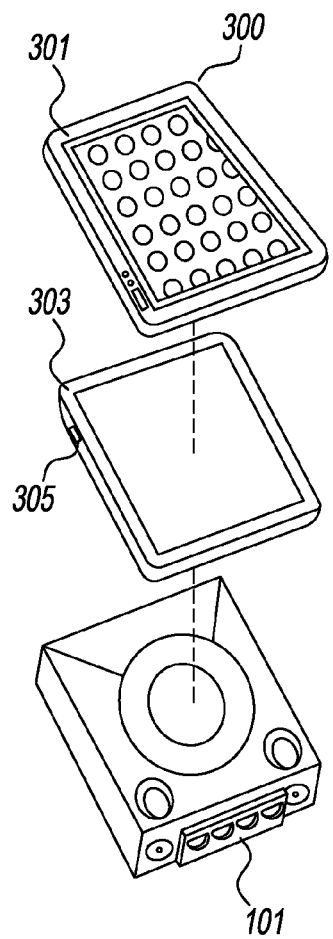
FIG. 3 describes an attachmentless-transceiver device 300, a kindred embodiment to an intermediary-transceiver device, and its potential for integration into a video-game console for allied touchscreen devices, in accordance with an embodiment.
Figure 3:
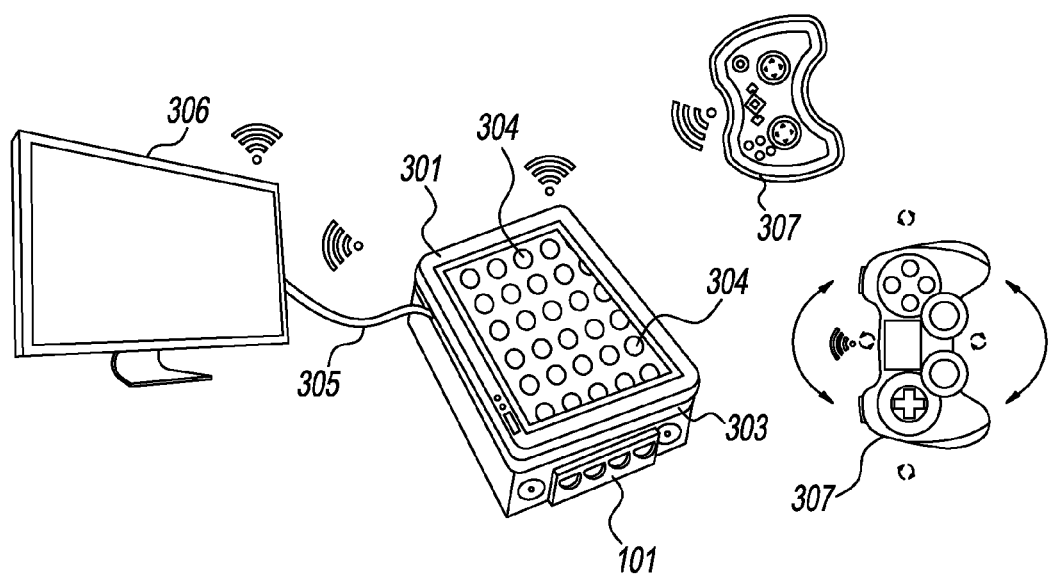

An expression of an intermediary-transceiver device may, as suggested in FIG. 2, be built into (or to complement) the video-game console 101 component and designed for communicable contact with a touchscreen device in such a way that the touchscreen of the touchscreen device 303 is mapped comprehensively upon attachable engagement, thus potentially supplanting the need for a virtual mapping interface on, and the related calibration of, a touchscreen user device 102. Particular to an embodiment described herein, an interface of actuators supplied by a serviceable intermediary-transceiver device 300 is shown in FIG. 3. The mapping interface, comprising an attachmentless-transceiver device 300 with cradle system 301, is capable of producing, managing and distributing (directly to the surface of a contactually positioned touchscreen) a quantity of capacitance (a capacitive charge) for the intent and purpose of controlling an actionable object displayed on the touchscreen of a touchscreen device 102 allied with a video-game console 101. A grid-like assembly of insulated distribution nodes 304 engrosses the cradle face 301, according to an embodiment of the present invention. The distribution nodes 304 are capable of strategically delivering a capacitive load directly to the soft-buttons and/or related soft-input interface of a subjected touchscreen in a manner faithful to an input sequence (associated with, exempli gratia, a linked input controller 307 or finger gesture, operated remotely from the touchscreen user device 303). The present embodiment thus eliminates completely the need for a wire tether by having the attachmentless-transceiver device 300 with cradle system 301 act as "the attachment interface", directly, since the touchscreen surface of a touchscreen user device 303 is strategically attached (by positioning) to a plurality of protuberances or distribution nodes 304 supplied by the cradle 301 system.

By way of example, and not limitation, integration may occur whereas an attachmentless-transceiver device 300 with cradle system 301 may be manually attached (as an accessory device) to a touchscreen directly by a user and/or under the guidance of an associated mechanical apparatus (e.g. a hinged-delivery system subjecting the salient domain of a touchscreen to contactual alignment with the distribution nodes 304, particularly) prone to positional influence—or placed in association with a proximate receptacle to which it resides. The attachmentless-transceiver device 300 with cradle system 301, in accordance with an embodiment, is constructed as a mounted console 101 component allowing serviceable movement fluency of the cradle system 301 in a range of motion to wholly accommodate for the omnidirectional-mechanical or reflex influences dictated by a manipulated sensor-based controller input 307. The plurality of protuberances or distribution nodes 304 in direct association with actionable objects on a touchscreen surface, make the actionable objects on a touchscreen directly actuateable in accordance with the parsed and reciprocally (that is, to its correlative output) mapped input-directive counterparts being targeted for capacitive discharge (the correlative discharge output to a soft-button input) by the attachmentless-transceiver device 300 with cradle system 301. A exemplary expression, without suggestion of limitation, that is serviceable to the spirit and scope of this discourse in introducing a new delivery system and gaming console platform that target touchscreen devices, thus potentially positioning users into a new era in interactive entertainment, this in accordance with an embodiment.

Furthermore, in highlighting the potential for "out-of-the box" controller operation (e.g. no pregame configuration or mapping assignment entries potentially being necessary) that may be ushered into a playing environment by the described attachmentless system of controlled capacitive discharge, the attachmentless-transceiver device 300 component of a gaming console 101 for touchscreen devices thus seeks to continue to revolutionize the advent of touchscreen controller systems forwarded by the inventor. With a potentially seamless cadence to interoperability across and amongst a far broader spectrum of hardware platforms, commissioned software and operating systems, than a system, exempli gratia, that is wholly software reliant and dependent on mapping configurations to be entered prior to gameplay, the library of expanded titles that may be made available to the user through this technology may be profound. Further still, this technology may help the user bypass entirely the need for a touchscreen controller system to be ported and mapped for input controller compatibility with particular gaming titles since the hardware of the present invention may act as the controller's gatekeeper (that is, it may run entirely through the hardware present and not under and/or responsible to the governing influence of external-media software running on the host device in certain operating environments; particularly for the controlling of actionable objects). Even a foreign OS, such as a Linux distribution, exempli gratia, may be installed to a platform's hard drive component for interoperability and game-ready status of apps normally native only to the foreign OS. Similarly, emulation-based software may power the platform base; with broad emulator-based compatibility and/or compatibility via open standards being present under the robust footprint of the present invention.

Returning the discussion again to a mapping-based system of the present invention, the controller system present under the management of an attachmentless-transceiver device 300 (and, upon assimilation, under a video-game console for allied touchscreen devices generally) may be manufactured to provide both wired and wireless interoperability between a mass of gaming accessories, such as, but not limited to, the expansive list of controllers and/or specialty controllers available for traditional gaming consoles in the marketplace, including specialized-pointing devices (e.g. a gaming mouse or wearable technology), through a physical or virtual mapping process under adroit compatibility and by any means serviceable. The specialty controllers designed by the inventor and under common ownership are, of course, also fluently compatible with use of the gaming console 101 with allied touchscreen device 102 and may prove more feature rich, seamless and touchscreen intuitive than its traditional counterparts. Such specialty controllers transitionally designed for touchscreen assimilation by the inventor, exempli gratia, may include a software platform that largely automates the process of mapping where coveted, with an emphasis on user convenience.

Integrative mapping, in the spirit and scope of this discourse, may further be ushered into a gaming environment, as an example, by virtue of specially designed software programs (e.g. programs made available for download) that are dedicated to serviceable configuration metrics and/or a range of interoperability syncing tools that may be present "under the hood" of the video game console 101 with allied touchscreen device 102 upon, for instance, the finalization of an app purchase. Offerings, such as, but not limited to, an easy-to-employ controller database for readying a selection in reference to enlisted integrative-mapping covenants, app-specific controller layouts and other such similar tooling mechanics, may be presented to the user by the gaming console 101 with allied touchscreen device 102, the assimilated attachmentless-transceiver device 300 and/or by the allied touchscreen device 102 for purposes of manipulating an actionable soft input in the spirit and scope of this discourse. By way of example and not limitation, technologies such as NFC may further be employed such that as an allied touchscreen device 102 is placed in proximate association with the gaming console 101, a mapping interface for the given external-media content is automatically launched by said gaming console 101 (e.g. auto calibration with said interface recalled based on a past stored-configuration event for a given gaming title or presenting the user with an option of configuration for storage in the immediate controller environment and to automatically facilitate mapping for a given gaming title going forward upon said NFC trigger). A software disposition may be fundamental to the described mapping interface and may further serve an auxiliary purpose of augmenting the external media for, exempli gratia, the internal-memory storage of high scores for a gaming title that may be readily recalled in an NFC-triggered environment. Moreover, any software-configuration and database tools of interoperability, where applicable, may be capable of being instantly updated online, as an example, for current, seamless interoperability of a wide array of foreign (including new) controllers that exist in a touchscreen environment.

Figure 6A:
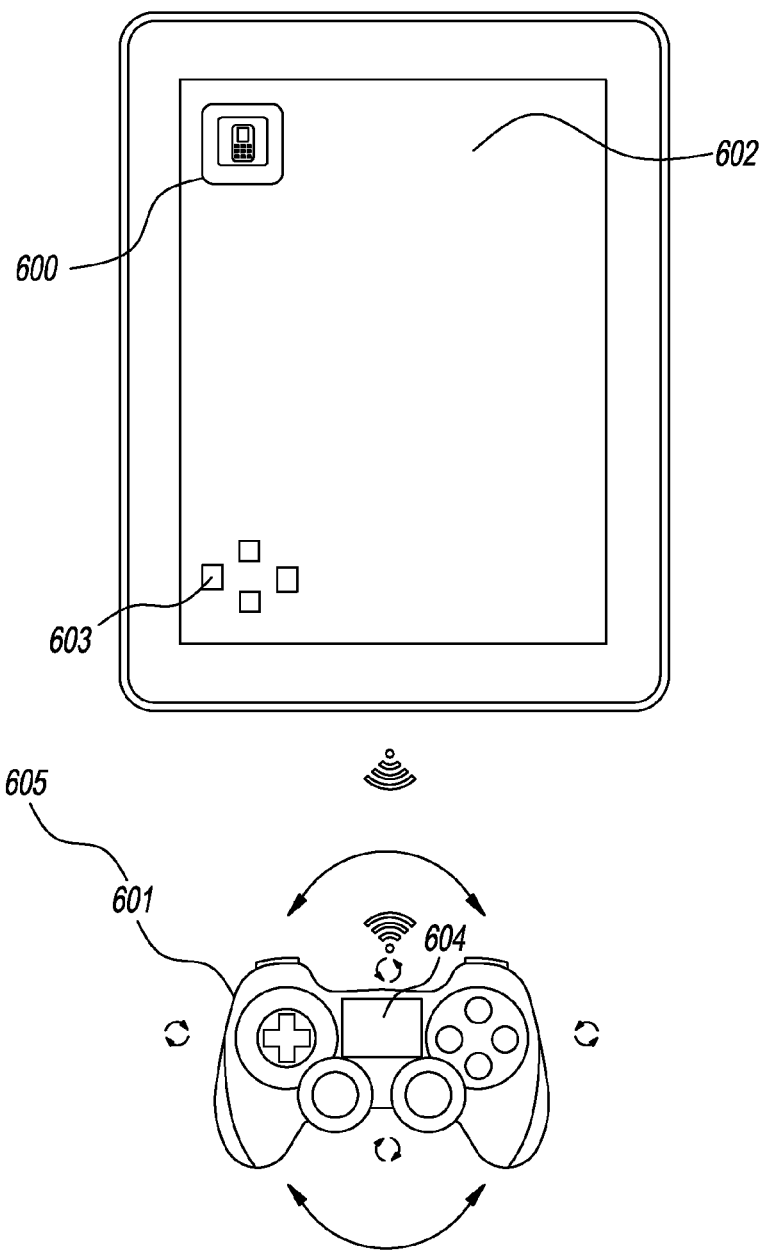
FIG. 6A illustrates a robust input controller for touchscreen devices offering a medley of user-influenced inputs and its related mapping discourse, including virtual or non-mechanical sensor-based manipulation and correlative mapping translation (of the corresponding input directives of said input controller) to a remote touchscreen device, in accordance with an embodiment.

Integrative mapping may further be ushered into a gaming environment under the control-input influence of a wireless input-controller with a specially built-in touchscreen and/or touchpad interface, for potentially one-to-one integrative scaling in a mapping environment (the reader may refer to FIG. 6A for related and more detailed discussion). As per a plurality of related and previous disclosures under common ownership of the inventor, the attachmentless-transceiver device 300, of course, operates under a likened technological domain of the previously demonstrated intermediary-transceiver device teachings and is too, capable of reiteratively producing, allocating and strategically deploying (to a point of capacitive discharge on a touchscreen, as suggested above) a quantity of capacitance under the proficient stewarding of an electronically managed system integral to the gaming console 101, the allied touchscreen device 102 and/or assimilated attachmentless-transceiver device 300. Pairing the attachmentless-transceiver device 300, to add colour by example, to coincide with real-time input gestures determined by an associated trackable camera, potentially permits for fluent gestures, such as a finger pinch, swipe, drag articulation and/or positional allocation, to be instantly delivered for actuation to a touchscreen (via its distribution nodes 304 reproducing [a gesture] and actuating in real-time) without the requirement of a complementary virtual mapping system and, therefore, the renewed calibration requirements that may be imposed on the user when shuffling between a variety of gaming titles with varying controller disposition, altogether. Manipulable graphical pointers, potentially free of mapping-based entry requirements and discussed in greater detail in a following embodiment, may also be assigned to the dynamics of the exemplary controller environment. Camera-based graphical pointers may or may not be required to contact an actionable object being targeted for actuation to occur as the console device may assign a "template" to simplify controller disposition. As an example, graphical pointers can be locked to each entry of actionable soft-buttons of a fixed soft-button controller where the user can use directional gestures to trigger a respective soft button without the need for precise contact (e.g a custom controller where pointing up actuates an up button of a soft-button interface, a downward gesture and/or pointing of a finger actuates the down soft button, etcetera).

Under the teachings of the present invention, the need for a wire tether is admittedly, as previously stated, jettisoned from requirement by the development of an attachmentless-transceiver device 300 with cradle system 301 that securely accepts the face of a touchscreen user device 303, and more particularly, the germane domain of a touchscreen user device's 303 touchscreen-surface area—and any respective soft-buttons that may be present—to a strategically mapped and comprehensive point of direct, contactual alignment between the touchscreen's surface and the attachmentless-transceiver device 300 with cradle system's 301 distribution nodes 304. In an operative sense then, a touchscreen user device 303 may be "attached" to an attachmentless-transceiver device 300 by virtue of the contactual alignment. The attachmentless-transceiver device 300 with cradle system 301 may be equipped with a system of sensors that are able to precisely detect the physical presence, including positioning and measurement, of a touchscreen device (and more particularly its touchscreen-surface area) for more precise and accurate (and potentially automatic) mapping of the associated salient screen domain. In other words, the cradle interface 101 may automatically gauge screen size and scale it accordingly to a touch input interface (e.g. such as with the use of the aforementioned touchpad of a specialty controller input device). It may also have the ability to automatically determine the presence and exact coordinates of soft buttons comprising a soft controller disposition such as, but not limited to, a virtual thumb stick and a wide range of button styles and their respective layouts. And in relation to virtual controller dispositions, future app programming may provide the option of removing the virtual controller dispositions, once serviceably mapped, for unencumbered game display.

The attachmentless-transceiver device 300 with cradle system 301 may thus be, in a further instance and without suggestion of limitation, suited for locational proximity to the face of the gaming console 101 with allied touchscreen device 102 (e.g. by virtue of an integrative compartment), perhaps even acting as an accessory component in the assembly. In this way, exempli gratia, a charged, Bluetooth-equipped and manually placed (for communicable attachment) attachmentless-transceiver device 300 with cradle system 301 by a user occurs after a touchscreen device 102 has first been mounted to an omnidirectional base. A parallel user experience may thus apply wherein: since a user may be first required to mount or insert the allied or associated touchscreen device and its external media (e.g. a gaming app) into a video-game console 101 of the present invention—it may borrow from the patterned behaviour of a user first being required to insert a game cartridge, DVD title or other such external media into a receiving apparatus of a traditional gaming console upon start up to engage loadable content prior to game play. And in reference to loadable content, in a transitioning and kindred thought, for those applications requiring highly-secure log in and/or administration privileges, the reader notes that facial recognition software may work collaboratively with an associated camera to restrict unauthorized access.

The cradle 301 interface as it is shown, suggests an operating scenario, for instance, where a touchscreen device, depending on fabricated design metrics, is placed face down or up on the cradle 301 of the attachmentless-transceiver device 300. Such variant positioning, of course, may thereby prohibit a user's direct visual access of the associated touchscreen device's display output. Accordingly, some manner of remote or live output 305 of a touchscreen's rendered contents can be required to occur in its place, which is where, for instance, the use of an incorporated Digital AV adaptor or Component and/or Composite AV cable, such as an HDMI AV cable, in the video-game console for allied touchscreen devices (FIG. 1) may be warranted (under a wired expression). Availing the use of a Digital AV adaptor or Component and/or Composite AV cable, such as an HDMI AV cable, without suggestion of limitation, is a common method of live output 305 and occurs (refer to FIGS. 8A, 8B for related discussion) from the touchscreen user device (source) 303 to an output device 306 (target), commonly an HDTV or Ultra HDTV. Standards such as, but not limited to, Miracast will also be supported in an operational environment of the present invention to add breadth and depth of live output (e.g. by virtue of a peer-to-peer wireless screencast standard formed via Wi-Fi Direct connections in a manner akin to the use of Bluetooth) disposition. Projection technologies, such as a digital projector or serviceable projection-device, without suggestion of limitation, may be enlisted as, alone or in combination with, a method of live output in alternate operational deployment environments. Projection technologies may also be utilized as an intuitive control and input method to, for example, overcome incidence of traditional screen occlusion. Beyond broadcast of a standard video live output, holograms and laser articulation (and any virtual reality agent that bolsters game play) could further be implemented into a touchscreen environment and furnished by the gaming console 101 (for touchscreen devices) with allied touchscreen device 102. Conversely, if a user prefers, since a video-game console 101 component may comprise a mountable apparatus to visibly suspend a touchscreen device 102 and its visual (display) output, mounting options for either portrait on landscape mode may be presented to the user.

Indexing the grid-like assembly of distribution nodes 304 to determine which nodule or nodule plurality is/are in linked association with the engagement of a respective soft-button, soft-button plurality, soft-input and/or any actionable object in a rendered environment, such as that rendered by a refreshing play field during the course of video-game play, may, exempli gratia, be accomplished by the introduction of any serviceable means of co-ordinate tracking and mapping precepts. Once the dimensions of a touchscreen are determined, for instance, the available distribution nodes 304 could be "scaled" accordingly to map the entire touchscreen, that is, all its salient domain upon attachment, and be highly responsive to a modal input, such as a gesture. This system of mapping configuration would require very little user involvement, as the program is designed to have the process be largely automated.

Furthermore, in a kindred mapping system to the scaled embodiment just described, a mapping system—at least some of its primary components—may be a highly intuitive one in an alternate iteration. An input-controller system with touchpad/touchscreen interface, for example, may be "mapped-to-scale" with an associated or allied touchscreen device 102 of the video-game console 101, resulting in direct finger input onto the touchpad/touchscreen of an actionable-object controller 307 being translated instantly to a matching-coordinate throughput complement on the remote touchscreen of the allied touchscreen device 102 of the gaming console 101 by a corresponding capacitive discharge deployed by the respective distribution nodes 304 of the attachmentless-transceiver device 300 when in the position. Virtual "discharge" under a mapping complement may, of course, also be the actionable agent in a variant embodiment. References to scaled or scale, to add colour by example, may refer to the surface area of a touchpad scaled, without suggestion of limitation, 1:1 to the touchscreen's surface area resulting in instant and fluent finger "throughput" translation.

Moreover, for controller environments requiring associative mapping software on the touchscreen user device 303, the gaming console (now described without assimilation of an attachmentless-transceiver device 300) or both, a method that may subject the user to pre-play calibration, can be capably equipped to faithfully manage and supply the requisite virtual "actuation" of an actionable object or object plurality at a targeted or indexed coordinate tile by virtue of wireless engagement, and are all serviceable operating scenarios in accordance with this exemplary discourse. Despite a large commitment of literary focus in this embodiment, the reader notes that the need for physical mapping in a controller environment is not at all essential and a virtual interface may in fact be the preferred method of disposition by a user. The reader may further refer to FIGS. 6A, 6B, 6C, amongst other serviceable delineations, for more detailed and related discourse of exemplary mapping principles.

Serving to further illustrate the process of mapping-based indexing in the framing of an embodiment with a tangible disposition, an x-axis and y-axis delineation (with more detailed x,y mapping discoursed in patent Ser. No. 13/005, 315 under common ownership of the inventor) may be referenced. Whereas, in a simple example not requiring illustration, the actionable soft-buttons of a touchscreen may be hypothetically located at coordinates X1,Y2, X3,Y2, X2,Y1 and X2,Y3 on a touchscreen user device. The grid-like assembly of distribution nodes 304 spanning the cradle interface 301 may be electronically indexed into a subset of affiliate (coordinated tracking) distribution nodes 304 based on the determined mapping of their soft-input or soft-button counterparts. The hypothetical soft coordinates and their respective association for tangible application will now be discussed in more detail below.

In exemplary discourse assuming integration or assimilation of the attachmentless-transceiver device 300 into the video-game console 101 for touchscreen devices 102, a microcontroller board and serviceable wireless radio responsible for the attachmentless-transceiver device 300 may be communicably coupled with an actionable-object input controller 307 situated remotely from the touchscreen user device 303, as input directives are calculated by serviceably manipulating the actionable-object input controller 307, such as those directives paired with the soft-button coordinates for intended transmission, the input directives are instantly and faithfully transmitted to the video-game console 101 and then onto the distribution nodes 304 for correlative processing and an actuating conclusion. An actionable-object controller 307, in further instance, may also communicate directly with a nested touchscreen device 102 in an alternate iteration, of course, but the emphasis, as per this embodiment, is on actuation delivered by an attachmentless-transceiver device 300. An actionable-object controller 307 may be preconfigured for mapped use prior to engagement, where necessary and may, exempli gratia, comprise its own dual-sided tracking camera to potentially broaden the use of gestural-based modal input by a user (e.g. the duality capable of tracking both a user's hands and feet). Preconfiguration tools handling, for instance, any requisite mapping preconfigurations and installation steps may result in the saving of any eventuated serviceable data to an internal-memory source for automated processing efficiencies with an embedded application's controller environment (upon launch) going forward. Moreover, the internal-memory source would also allow the user to download and store contents of an on-demand app repository; thereby expanding the user's gaming options.

Building further now on the example set forth, said microcontroller board derives the broadcast input directives for instant execution or deployment of a respective capacitive charge via the distribution nodes 304 interface—with this actuating charge manufactured and/or furnished independently by the attachmentless-transceiver device 300 and under the governance of said microcontroller—across all salient distribution nodes 304 deemed to be "in play" under the aforementioned process of indexing or coordinate tracking, in the order it was received. An actuating charge may thus be instantly deployed unto the respective soft-buttons of a touchscreen user device 303 directly upon contactual attachment of a touchscreen device (with its touchscreen surface facing upward or downward) with the face of a cradle 301 supplying an encompassment of distribution nodes 304; in a manner faithful to the coordinate input directives (commencing the cycle that ends with capacitive discharge) received from the leading manipulation of an actionable-object controller 307. Deployment of a requested plurality of capacitive charges upon input controller manipulation therefore occurs at the positional touchscreen domain corresponding to the X1,Y2, X3,Y2, X2,Y1 and X2,Y3 distribution nodes 304 earlier ascribed for targeted engagement under the process of soft-button mapping facilitated by, without suggestion of limitation, an indexing process and used here to help promote understanding. Said differently, the process of indexing matches a controller input with its correlative soft-button input and the attachmentless-transceiver device 300 may control the actuating conclusion. And, of course, as previously suggested, indexing may not occur as a specific manual input coordinate or coordinate plurality based on the mirroring of, for instance, an evolving (and potentially evolving) soft-button interface and instead may comprise the whole touchscreen under a fluid, manipulating influence, such as articulated hand/finger gestures (e.g. one tracked by an associated camera-tracking system, FIGS. 6B, 6C) that may be coveted in response to a fluid controller environment.

An alternate embodiment that builds off the present invention described thus far in FIG. 3 (not the subject of illustration), while maintaining the spirit and scope of the associated disclosure, may find a thin, transparent overlay, capacitively networked by an intricate lining of transparent ITO coatings each possessing fluid properties of conduction (with the ITO-based channels and tiles described more fully in FIG. 4), and seeking attachment over the touchscreen of a touchscreen device, as it sits on the cradle of an intermediary-transceiver device: this time with the screen-side of a single touchscreen potentially facing out and therefore unencumbered to promote normal viewing, where coveted. This iteration may, exempli gratia, lack the distribution nodes' 304 interface to that described above and assume a variant discharge system, suggesting breadth of applicability. The reader notes that an attachmentless-transceiver device 300 is equally capable of furnishing both virtual and physical (capacitive discharge) actuation, dependant on an enlisted dichotomy of controller environments.

According to an embodiment, FIG. 4 illustrates an alternate method and assembly of strategically deploying a capacitive charge or charge series to the receptive touchscreen of an allied touchscreen user device 408; the potential for integration into a gaming console 101 with allied touchscreen device 102, although remaining unillustrated for clarity of isolation, being obvious. That is, the embodiment, while illustrated independently of a gaming console 101 to facilitate understanding, contains a method and assembly that is readily assimilated into said gaming console, where coveted. Coordinate deployment herein, by way of a non-limiting example, is based on an input metric provisioned by a trackable gesture. A controller environment for a video-game console 101 for touchscreen devices 102 may comprise an assimilated touchscreen docking-station 400, readily built-into the intermediary-transceiver device 401, an equipped tracking camera 402 (capable of ascertaining input gestures for productive capacitive output), a junction socket with base 403 (responsible for furnishing a capacitive supply) and connecting ribbon strategically exhibiting the properties of conduction; shown in an assembly without suggestion of limitation. The assembly being designed in conjunction with a thin, transparent overlay 405 (to be described in detail further below). The method and assembly of the present embodiment permit for the productive tracking of a user gesture (an input) or gesture plurality for the intended purpose of translating said trackable-gesture or gesture plurality to an associated (domain) point (or coordinate point plurality in a series) of the touchscreen on a touchscreen user device 408 (by virtue of a modal output, faithfully, in espousing the managed ability for capacitive discharge in accordance with the associated exemplary discourse), just as if a user directly engaged a touchscreen user device 408 with the control input of a finger.

In serviceably tracking an input, without suggestion of limitation, a software app could be created that, once launched, syncs an on-screen pointer (rendering a continuance of orientation, facilitating such) with a tracking camera 402—innate to the touchscreen user device 408, a touchscreen docking station 400 and/or gaming console with docking station 400 assimilation—capable of full 1:1 user motion tracking and processing, such as with a finger-driven input modality. A library of gestures could be recognized beyond, exempli gratia, a simple "swipe" feature that can be easily ascertained, as a case in point, by a user swiping his or her finger in a particular direction. The torso, for instance, of the user and/or the frame of an output display device could be used as the configured backdrop for "framing" the touchscreen by a tracking camera 402 for the mapped input-orientation of a finger (although once the pointer is engaged, visual tracking of the graphical rendering could be maintained without the need for framing), where coveted. Orienting sensor apparatus for actionable engagement could further be deployed, where coveted and by any means serviceable, in a kindred controller environment. In further reference, potentially supplanting the enlistment of a touchscreen-driven mapping app, the docking-station assembly 400 may leverage use of an electronic assembly to inject a digital pointer on an accompanying live output display device (in a variation of transparency as it digitally melds with its content, not the subject of illustration) capable of actionable engagement as the digital pointer is digitally integrated with a touchscreen interface for fluent engagement. Bluetooth communication (et al, transmission for the integration of a digital pointer in a controller environment may occur by any wireless means serviceable) serves as the communicative link between and/or amongst the devices for collaboration in task.

A thin, transparent overlay 405 sees initial application of an independent tiling of transparent Indium-tin oxide coatings 406 on both its face and rear surface (to ensure a means of conductivity is present throughout the overlay in the areas treated/coated with the ITO only and not in the area adjacent to the ITO treatment, particularly noted in reference to the structured process of overlay layering that may occur) in an arrangement that equally departmentalizes (an assembly of equal parts or "tiles" comprising the tiled disposition, with repeated emphasis on the borders existing between the patterned transparent Indium-tin oxide coatings 406 or tile distributions 406 serving as an insulated environment upon tile application) the overlay for fluent touchscreen assimilation across all salient screen domain. The initial tiled pattern of transparent Indium-tin oxide coatings 406 is consistent and predictable, with a separate, communicable ITO conductive coating 407 or channel subset later applied to each tile of the initial application of transparent Indium-tin oxide coatings 406, thus forming an independent channel amongst an independently (that is, each being associated to a single tile) channelled plurality. The separate, communicable subset of ITO conductive coatings 407 or channels are applied to the upper surface of the overlay only (that is, so each transmission line is not capable of unintended transmission, along the span of a conductive channel path, to the (allied) touchscreen user device's 408 touchscreen surface residing immediately below the bottom of the thin, transparent overlay 405 upon attachment) and, hence, only serve as a connective conduit to the contact points (coordinate-specific discharge elements or "tiles") of the governing capacitive discharge system of the docking station 400 that may be readily assimilated into a gaming console 101 with allied touchscreen device 102 (being the recipient screen of the targeted capacitive discharge). Tile disposition occurs in an identical manner to its layered peers.

The capacitive discharge system supplies, manages and/or deploys a capacitive charge based on input metrics received, fluently, and, under the described method and assembly, is capable of honouring a conductive path from the point of origin of the specific tile of transparent Indium-tin oxide coating or element 406 seeking engagement and up to and including an associated channel's 407 exit point at the bottom of the overlay that seeks attachment to the respective contact point of a capacitive discharge element or junction socket 403 of the gaming console component. The highly-transparent coating strategy may provide (the reader will note that the dark squares and conduit lines or channels representing the Indium-tin oxide coatings 406 and separate, communicable subset of ITO conductive coatings 407, respectively, are for illustrative purposes only and such application of an Indium-tin oxide coating remains highly transparent in nature in practice) for virtually indistinguishable transparency upon application and touchscreen illumination, yet still affords the user comprehensive control functionality of the salient screen domain of a touchscreen user device 408, remotely, under the described method and assembly and in the spirit and scope of this discourse.

According to this exemplary discourse, a thin, transparent overlay 405 is individually layered (with the layering process, again, producing a finished overlay that is virtually unnoticeable when in place during touchscreen illumination; thus permitting highly vibrant broadcast definition) with respective Indium-tin oxide coatings 406 or tiles both produced and layered in verbatim (facilitating "mirrored stacking") arrangements to its identically layered peers. Upon layering arrangements (although such layering is not requisite to ensure an insulated environment is present for serviceable channelling), with repeated emphasis, care is made to ensure the upper surface of an overlay remains wholly insulated and not capable of incidentally transmitting a capacitive charge, upon capacitive engagement, to the surface of a touchscreen during the act of conductive channeling presented by the separate, communicable subset of ITO conductive coatings 407 applied to the upper surface of the layered transparent overlay 405. The described arrangement of the communicable subset of ITO conductive coatings 407 on the upper surface only, with no conductive throughput to a proximal touchscreen, in accordance with such exemplified depiction, forces deployment of a capacitive charge to occur only at an addressed or targeted (tile or element 406 at the channel 407 end) point of contact on the touchscreen of the touchscreen user device 408. Indium-tin oxide coatings 406 may assume, for instance, a size proximal to the width of a finger tip or the typical size of a soft-icon or the icon of an app to which the thin, transparent overlay 405 is capable of engaging remotely; for comprehensive coverage of all salient screen domain in the spirit and scope of this discourse.

The thin, transparent overlay 405 is removably attachable to the touchscreen of the touchscreen user device 408 by any serviceable means, such as, but not limited to, a residue-free adhesive coating and/or gummy application. The exit points 409 of the thin, transparent overlay 405 (the overlay serving as a capacitive output), without suggestion of limitation, may be reinforced with a conductive durability agent such as, but not limited to, an embedded conductive tab that securely envelopes both sides of the bottom of the thin, transparent overlay 405 for added durability and are respectively connected or tethered to the non-abrasive contact points of the capacitive discharge element or junction socket 403 directly and/or by introducing an apparatus such as, but not limited to, a connecting ribbon 404 to bridge the conductive path (or by any means serviceable). The contact points of the capacitive discharge element or junction socket 403 could further be the focus of additional measures to bolster durability of its tethered counterpart 405, the receiving apparatus. The entire assembly of which, as previously suggested, may readily be incorporated into a gaming console 101 with allied touchscreen device 102, where coveted, for faithful transmission in a manner that concatenates all coveted conductive paths in the spirit and scope of this discourse.

Beyond the applicable literal disclosure herein, the act of "concatenating" and its intent is further discussed in a body of the inventor's prior teachings; referring to those cited in the previously-filed intellectual property offerings above. Of course, the teachings of the present embodiment, all embodiments within the spirit and scope of this discourse, may be allied with other embodiments taught in this paper, where it may serviceable to do so, and, furthermore, may be allied to the embodying matter of all other applications previously submitted by the inventor, where serviceability exists. Whilst the focus of the described embodiment centres on a gaming console 101 with allied touchscreen device 102, the reader notes, as a non-limiting example, the obvious integration of a user-powered (that is, no current or voltage source would be required to operate the touchscreen docking station 400) data-entry component (e.g. a keyboard and/or keypad attachment) supplying a kindred socket assembly. Such batteryless controller disposition offers the marketplace a uniquely green-controller option and the potential for product footprints such as, but not limited to, "tablet-and-laptop" in-one configurations (e.g. with a removable touchscreen device [popping out from a user-powered, keyboard-based socket assembly] acting as said "laptop's" display screen).

Attachment characteristics potentially attributed to the particular embodiment: While the following exemplary discourse may suggest a practicable application of an attachment interface, it is not intended to suggest limitation in any regard and/or does not necessarily imply a specific method and/or system of preferred operability. Any deviceful input controller assembly described in the accompanying dissertation, may operate directly, in wireless mode under an established duplexing system, with its linked partner (e.g. an equipped video-game console of the present invention and/or a touchscreen device directly by virtue of a serviceable mapping system), thereby potentially displacing the need for an attachable physical interface. That is, reliance on a physical mapping interface in accordance with particular operating environments may, depending on the nature of the pairing and the controller environment, be supplanted by a serviceable virtual-mapping interface (e.g. electronically based and/or virtual-mapping actuation that is reliant on a complement of governing software).

The inset illustration of FIG. 4 details an exemplary operational environment whereas the utility of an intermediary device 410 and live-output device 411 are combined. The intermediary device 410—here wholly reliant on a virtual mapping interface in support of illustrative contrast—is equipped with at least one gesture tracking apparatus (for instance, a tracking camera 412) and a docking assembly for receipt of a touchscreen user device 413. Moreover, the intermediary device may furnish certain characteristics and functionality of a gaming console and remains compatible with a multitude of input controllers designed for the manipulation of an actionable soft input and/or input plurality being articulated by the external media (e.g. when serviceable gesture recognition is not being used as the primary modal input, although a plurality of serviceable and distinct inputs may concurrently shape a gaming environment). The hybrid assembly described is capable of direct audio and video broadcasting of source content to the larger display area.

Figure 5:
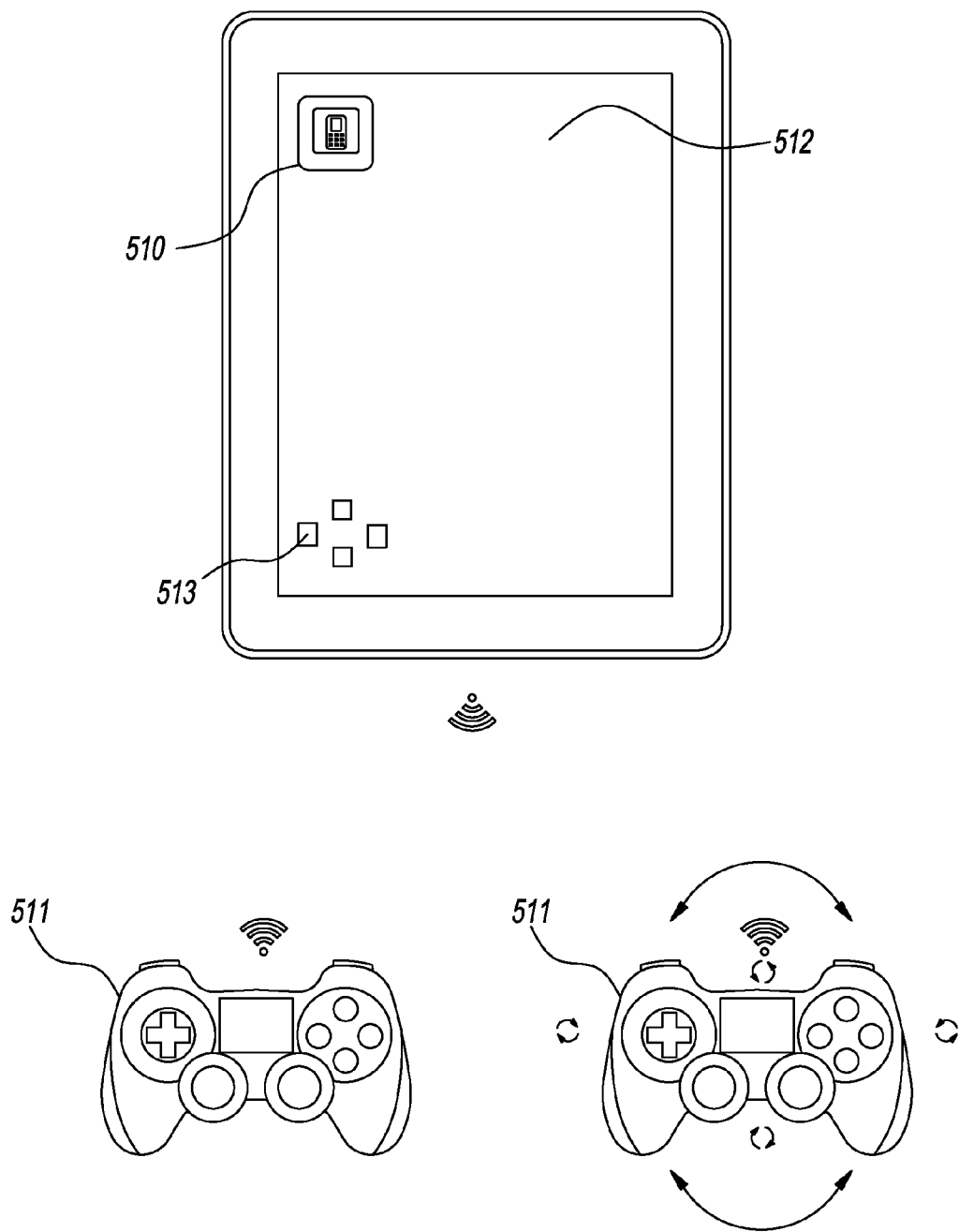
FIG. 5 illustrates a wireless controller and pairing app that can be integrated into a video-game console environment of the present invention, with or without use of an intermediary-transceiver device and attachment interface, in accordance with an embodiment.

FIG. 5 illustrates a wireless controller and pairing app that can be integrated into a controller environment employing a video-game console 101 for touchscreens—with or without use of an intermediary-transceiver device and attachment or actuating interface. For purposes of this discussion and simplicity in articulating an embodiment, the diagram is constructed independently of the video-game console 101. The wireless controller and pairing app represents an exemplary controller environment that remains integral to the breadth of suggestion of a flexible controller disposition of a video-game console 101 with allied touchscreen device 102 intended by the inventor. As a prelude to virtually controlling game play upon user introduction, a user may once again be required to download and/or preload an app-based, input/output mapping interface 510 or akin software associating the wireless controller 511 with the touchscreen device and/or gaming console 101 unit by association. Upon installation to a touchscreen user device, as a case in point, a user may then proceed to launch a third-party app that he or she wishes to engage control of with said wireless controller 511 and the input/output mapping interface app 510, running concurrently, may proceed to walk a user through, step-by-step, into configuring/pairing the wireless controller 511 for manipulation of an actionable soft input such as, but not limited to, an onscreen actionable object or object plurality, by any means serviceable. A screen-capture method, exempli gratia, being readily serviceable. An at least two-ring virtual-controller system (FIG. 6B) and a "virtual-matrix" method, see FIG. 6C also being readily serviceable; without suggestion of limitation by citing an example. Detailing the screen-capture method, the app-based, input/output mapping interface 510, as noted, may run co-dependently with a third-party app, such as an action game or RPG, and upon launch is targeted for wireless integrative control by initially proceeding to do a screen capture (where applicable) of the current soft-button controller 513 assembly required for traditional operational use. Under the described screen-capture method, all graphics displayed on a touchscreen 512 are subjected to, for example, a "line-drawing filter" being applied—thus, clearly rendering the respective shape of all touchscreen graphics including the soft-button controller system 513 that is subjected to manual manipulation or correlative selection in the configuration process—to facilitate mapping entries for soft-button engagement (not the subject of interconnected illustration by line association between the wireless controller 511).

Since the soft-buttons of a soft-button controller 513 may be readily delineated by the screen capture method described in this embodiment, the process of virtually pairing a manipulable input assembly (511) with its correlative soft-button controller 513 counterparts (under the proficient stewarding of an input/output interface app 510) may then become somewhat more intuitive. The process of delineation, in adding colour by example, may subject the soft-button controller 513 through a line filter that displays each soft button 513 as an "empty" square; with said parsed squares potentially assuming the appearance of "flashing" in their fixed position to indicate they have been registered as actionable and are each ready for configuration with the respective input/output interface app 510 and its associated wireless controller 511 input assembly.

Upon commencement of said flashing, the user may then proceed to tap each of the respective four-line squares of the soft-buttons 513 being assigned for control, for instance, and as each is tapped the user may then be asked to press the correspondent button on the wireless controller 511 upon which a wireless signal will then be instantly sent from the wireless controller 511 to the touchscreen user device 512; where the directive may be subjected to processing by both a central controller and the app-based, input/output mapping interface 510 software, to "lock" the controller association between the app in use and the wireless input controller 511 for manipulable use. Such locking is for the express intent and purpose of controlling an actionable input, such as, but not limited to, an actionable object displayed on a touchscreen. Once all active soft-buttons 513 are associatively paired, a user may commence game play. Under controller environments where a virtual mapping system is integrated for soft-button controllers directly between a wireless input controller 511 and a touchscreen user device, such as that indicated in this embodiment, the gaming console 101 may then serve, exempli gratia, other functions such as, but not limited to, acting as an intermediary agent for facilitating proximity-based mapping events, multiplayer layering and/or acting as the exclusive influencing agent on the motion-influenced input sensors of an allied touchscreen device nested in the gaming console 101. The commanding potential for remote manipulation of a built-in sensor such as, but not limited to, an accelerometer—an input sensor as discoursed in more detail in FIG. 6A—in heightening the gaming experience is furnished under the present invention. Given the video-game console 101 for touchscreen devices 102 may comprise an actuating interface and serve as an intermediary to the touchscreen device 102 for serviceable engagement, as per the spirit and scope of this discourse, the console 101 unit may further comprise an exemplary scanning device for reading a bar or serviceable code attributed to a gaming title. The bar code may comprise a mapping configuration for purposes of task automation and the inventor envisions promise for such akin consideration in future gaming releases (e.g. since the scanned bar code may permit for the standardization of soft-controller layouts and provide the user with instant mapping configuration).

Falling under the breadth and scope of the previous mapping-based discourse, the present embodiment of FIG. 6A and its kindred offspring (that may be integral to certain controller environments of a gaming console 101 for touchscreen devices 102) add further colour to the mapping-discourse discussion, while particularly referencing a sensor-equipped input controller for touchscreens. Although a gaming console 101 is not introduced into the drawing to simplify the discussion, those skilled in the art would appreciate the embodiment's propensity for seamless assimilation into a video-game console 101 environment for touchscreen devices 102. FIG. 6A illustrates a rechargeable and/or battery-powered wireless input controller 601 with built-in sensors and an associated pairing app 600 (control-bearing) integral to the control dynamics of an attachmentless-controller environment described herein and in accordance with a touchscreen 602 embodiment. As a prelude to controlling actionable objects and/or actionable inputs, such as input sensors, during the course of game play, a user may too be required to download and/or preload a mapping app or software-based, input/output mapping interface 600 (or any serviceable software). Upon download and related installation, a user may then proceed to download and/or launch a third-party app that he or she wishes to engage control of with said wireless controller 601 and the input/output mapping interface app 600, running concurrently. The able software will proceed to walk a user through, step-by-step, the congruous configuring/pairing of the wireless controller 601 with the respective soft interface for purposes of the control and/or manipulation of an actionable on-screen object or object plurality and/or an actionable sensor input deemed fundamental to a controller environment. For gaming titles where an actionable sensor input is deemed non-participatory to the game's input dynamics, the associative influencing agent(s) present (e.g. an omnidirectional mechanical influence) may be disengaged by the gaming console 101.

Pairing of an actionable soft input to engagement, described in the singular form to simplify understanding, exempli gratia, may occur by virtue of mapped electronic actuation at a targeted soft coordinate (for actionable object manipulation). Electronic or virtual actuation occurs in association with a respective virtual tether that is created to pair said actionable soft input with an engaged element of an input controller capable of virtually and remotely influencing an actionable soft input, by any means serviceable, in the broad context of the inventive discourse. Any serviceable means, may include, but is not limited to, a disclosed screen-capture method where a given screen in a controller environment is parsed for soft-button 603 determination so that a wireless controller's 601 input influence can be mapped (to the congruous actionable soft-buttons 603) to provide the end fodder for a virtual actuation conclusion (resulting in the manipulation of an actionable object).

The app-based, input/output mapping interface 600, as noted in FIG. 6, may run co-dependently with a third-party app, such as an action game or RPG, and upon launch is acclimated for wireless integrative control by serviceably assigning the current soft-button controller 603 layout and/or environment required for operational use (certain gaming titles may also be programmed with mapping code that an input/output mapping interface 600 may interpolate to simplify this task without requiring facilitative methods such as the screen-capture method involving a [potentially replaceable] degree of manual entry for coupling purposes) to an assignable physical input controller. The reader notes that any process of virtual assignment, within the spirit and scope of this discourse, is serviceable in example and covets to facilitate a heightened degree of fluency and purpose in electronic mapping.

Referencing the process of "parsing squares" in a controller environment again, under certain iterations, said parsed squares may also repeatedly shrink and expand in size or assume an appearance of "flashing" in their fixed position (perhaps upon user selection as a soft-button mapping component) to indicate they are registered as actionable and are awaiting formal pairing to an associated wireless controller 601. Upon an indication of flashing, the user may, in further exemplary discourse, then proceed to tap each of the respective flashing squares of the soft-buttons 603 being assigned for control, one at a time until thorough assignment, and as each is tapped the user may be instructed to select the corresponding button on the wireless controller 601 to where a wireless signal may then be, exempli gratia, instantly sent from the wireless controller 601 to the gaming console assembly for serviceable association with the allied or coupled touchscreen device 602 for respective soft-button "locking". Controller directives may be subjected to processing by a microcontroller unit and/or processor (of the touchscreen user device 602, the gaming console 101 hardware and/or the wireless controller 601) and the app-based, input/output mapping interface 600 software in the process of "locking" controller directives amid the wireless controller 601 disposition and the application's soft-button 603 disposition (for controller influence of an actionable input, such as, but not limited to, an actionable object or object plurality on a touchscreen).

Figure 6B:
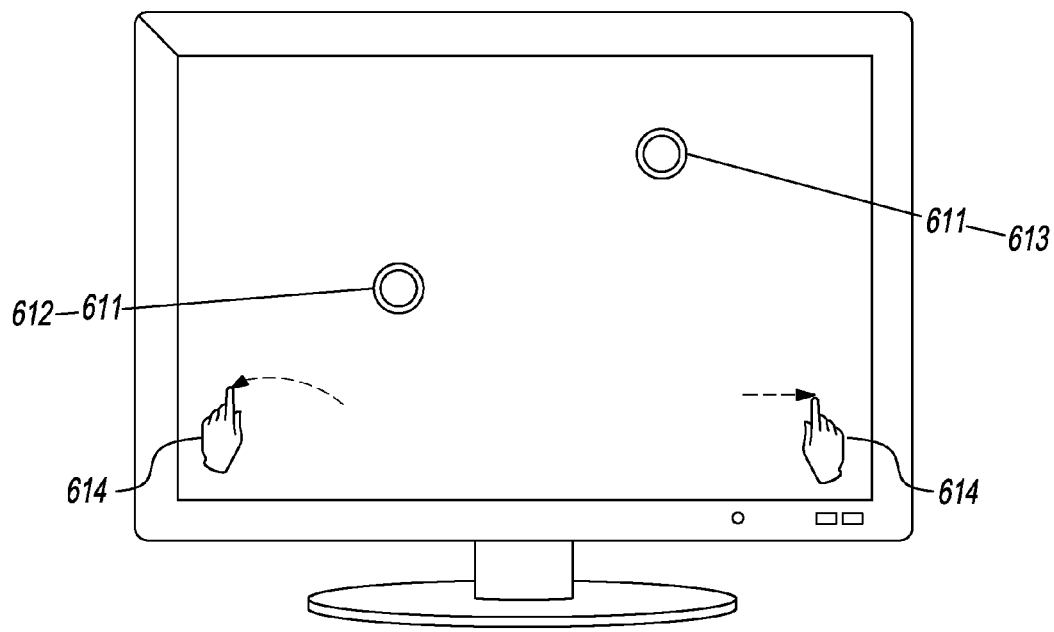
FIG. 6B illustrates a remotely manipulable, semitransparent set of digital rings—comprising a two-ring system of a controller environment—and a kindred disposition supplanting the rings with digital hands, as intended for digital injection into a controller environment governed by the gaming console 101 with allied touchscreen device 102, in accordance with an embodiment.
Figure 6C:
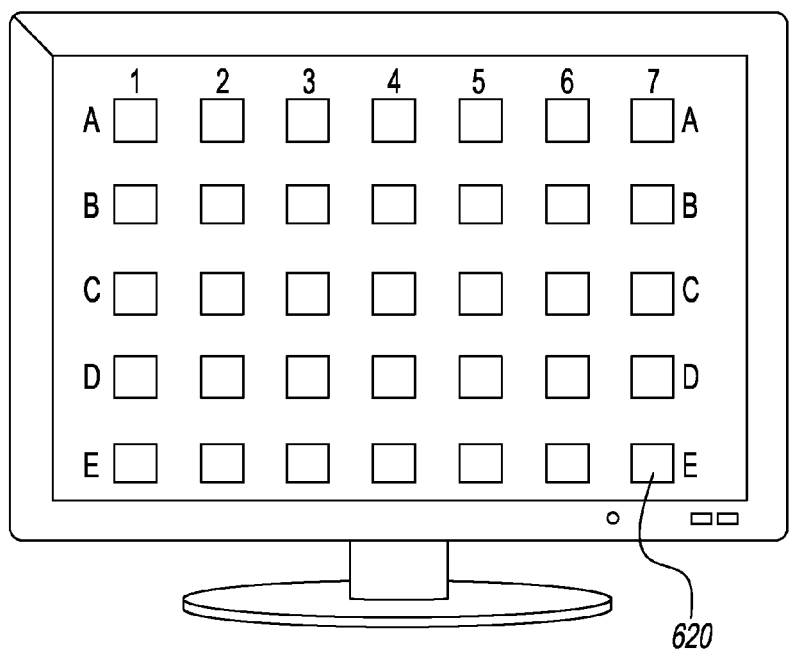
FIG. 6C leverages a mapping system into a video-game console environment of the present invention that compartmentalizes the touchscreen into a comprehensive array of digital tiled squares, a form of "virtual matrix", to facilitate comprehensive coverage of all salient screen domain of an associated or allied touchscreen device for the intent and purpose of virtual mapping delivery of an input directive or plurality of directives, in accordance with an embodiment.

In yet another serviceable embodiment, serving to suggest breadth and scope to task, a software-based input/output mapping interface 600 may also compartmentalize the touchscreen into a comprehensive array of digital tiled squares 620 (a uniform pattern of disposition [a form of "virtual matrix"] that may assume, for instance; a digital tile 620 size proximal to the width of a finger tip or the size of a traditional soft-icon or the icon of an app in a traditional virtual arrangement, FIG. 6C) to facilitate comprehensive coverage of all salient screen domain of an associated touchscreen device for the intent and purpose of mapping delivery (involving the remote manipulation of an actionable onscreen object, with all digital tiles 620 or nodules actionable, in their entirety, providing for a comprehensive screen-mapping interface). In this way, as a virtual grid of tiled squares 620 is established, a facilitative environment for mapping and thereby virtual actuation by precise coordinate (e.g. representing a manually-selected digital tile 620 addressed to a soft-button and pairing or matching it with a respective input button on a physical controller input) is established, in the spirit and scope of this discourse, without the need for the mediation of an intermediary device. Furthermore, for games requiring limited soft-button functionality, exempli gratia, an input/output mapping interface 600 may replace the traditional soft-button interface and/layout, with its own custom interface, so for games involving only a single command such as jump, any place on the touchscreen may be mobilized to act as the jump command (or, in a further suggestion of breadth and scope, a player physically jumping as discerned by a trackable camera) in place of the standard soft-button—making control navigation easier, where coveted. Shortcut (e.g. an input controller is mapped where an x button represents an actuation of a leftward finger swipe imparted virtually) and hotkey-based input commands (e.g. a user pressing then holding down the B button on a communicable input controller, gaming mouse and/or keyboard causes a player to first jump, then stylistically block a thrown basketball before engaging in a celebratory shuffle) may also be serviceably introduced to a touchscreen-based controller environment, thus adding to the potential of a highly-customizable interface.

Moreover, beyond the suggested manipulation of an actionable soft object by, exempli gratia, a form of electronic pairing and conclusional "virtual actuation", the wireless input controller 601 may also comprise its own electronic sensors, including, but not limited to, proximity, accelerometer, magnetometer and device-positioning and motion sensors, such as a gyroscope, under the management of an integrated circuit. Mapping correlative sensors of a touchscreen device with the correlative sensors of an input controller device assigned to a touchscreen device (for remote manipulation of a touchscreen's sensors by first manipulating the paired sensors of said input controller) becomes revolutionary in its fold. In this way, a much more comprehensive mapping system is described (and made possible), thereby potentially positioning the user for a dramatically heightened and immersive touchscreen-gaming experience using a remote and familiar tactile-friendly (in contrast to finger application on the flat glass surface of a touchscreen) controller interface.

Sensor-derived directives (again, borne from a plurality of manipulated sensor inputs by virtue of the respective manipulation of the wireless input controller 601 comprising them) of a controller input device, for example, may be processed by an associated processor for the transmission of a comprehensive derivation of input directives to a touchscreen-based gaming console (e.g. that then facilitates an actuating conclusion on an allied touchscreen device via an actuating interface and/or serves to mechanically and/or non-mechanically influence an allied input sensor of an allied touchscreen device) and/or directly with an equipped touchscreen device 602 with an associated input/output mapping interface 600 (a software iteration) for related processing. The present invention of a physical controller embodiment is thereby positioned to advance a "reflex" response, termed by the inventor as "comprehensive-gesture mimicking", for the faithful translation of a detailed physical gesture or gesture plurality into a virtual environment for touchscreen devices. Said differently, manipulation of a sensor input of a wireless input controller 601 can be virtually mapped to faithfully reproduce the corresponding sensor influence on a remote touchscreen device, such that, for example, rotational acceleration of the wireless controller 601 is processed, interpreted for pairing and synonymously (and virtually) mapped (to action [or actuation] or the virtual manipulation of a sensor input), as said rotational acceleration instantly "occurs" in the touchscreen user device by virtue of a software influence. Said, of course, without suggestion of limitation in sensor mapping. As this process of interaction evolves, such conditioning may change the way touchscreen games are programmed with a touchscreen UI.

Accelerometer controls for a racing-themed app, for instance, and without suggestion of limitation, can be influenced remotely by pairing an equipped wireless input controller 601 with accelerometer sensor and a touchscreen device hosting an app-based, input/output mapping interface 600, or directly to the race-themed app itself in divergent iterations. The touchscreen device may, of course, also be allied with a gaming console 101 component, by any means serviceable, for the task of virtual accelerometer mapping and virtual manipulation of the touchscreen-based (accelerometer) sensor input—or inputs in the manipulation of a sensor plurality—in real-time, without the reliance on traditional hand manipulation of a touchscreen device. The present embodiment being articulated by the inventor as a groundbreaking wireless input controller 601 influence of, or interaction with, a touchscreen user device 602 and each of its responsive control or input sensors, such as, but not limited to, the accelerometer, gyroscope, magnetometer, proximity, orientation and/or any serviceable touchscreen-based sensor input capable of being virtually mapped and virtually manipulated, remotely, in the spirit and scope of this discourse. A virtual mapping event may, of course, be saved to the internal-memory of a console 101 for future interchangeable access with an embedded software module engagement; where it may be favorably disposed in doing so. Divergent embodiments may, of course, suggest a method and assembly of "X" virtual mapping, where an input sensor "X" of a wireless input controller 601 device (suggesting divergence and breadth beyond the accelerometer-based input-sensor theme addressed above) is virtually mapped to a touchscreen-based input sensor "X", thus permitting remote, faithful and virtual manipulation (or influence) of input sensor "X" on a touchscreen user device 602. Additional (remote) touchscreen-controller empowerment may, of course, result when marrying "twin" sensors beyond that used (e.g. reference to an accelerometer) in accordance with this exemplary discourse and/or when marrying a concurrent combination of a plurality of distinct sensors—with mapped control of actionable objects remaining active during the process of mapped sensor manipulation—thereof. Remote manipulation of a soft-input, including, but not limited to, the presence of at least one sensor-based input and actionable-object disposition in a controller environment, may thus serve as a disruptive innovation to the traditional limitations inherent in touchscreen gaming.

The wireless input controller 601 input, capable of vibrotactile feedback, may further comprise its own touchscreen and/or touchpad interface 604, each being fully fluent in touch/tap gesture recognition, as an additional type of remote modal influence of a soft-input or input-interface on a touchscreen user device 602 (for example, in the manipulation of a soft-button interface and/or a digital pointer by virtue of the correlative manipulation of an equipped wireless input controller 601). In a practicable suggestion of breadth and scope, a system may, exempli gratia, be introduced where visual and tactical mapping may occur instantly since the touchscreen content being displayed on the touchscreen display 604 of a wireless input controller 601 exhibits verbatim display content (and actionable content thereof) as the original display content of a remote touchscreen user device 602. A peer-to-peer wireless screencast standard such as, but not limited to, Miracast may be leveraged for the verbatim synchronization between both touchscreens in accordance with the exemplary discourse.

And since all germane inputs (including all soft and hardware-based sensors) of the present embodiment are, exempli gratia, communicably tethered automatically without the potential need for tedious manual input or configuration—by nature of the mirror-like reproduction occurring between both of the involved touchscreens and the (verbatim) mapping footprint shared between both paired devices—it may promote the premise of one-to-one scale manipulation of all germane input requirements of a game, remotely, by virtue of the respective manipulation of a single wireless input controller 601 by a user. And since the actionable soft-buttons 603 of a touchscreen user device 602 are correlatively present in a mirror-like rendering on the individual touchscreen 604 of the wireless input controller 601, the potential exists for a user to control an actionable object from both a physical button interface and/or by targeted soft-button association on its touchscreen 604. Control of an actionable object may, of course, be articulated in both gaming and non-gaming (e.g. in programming and/or controlling a TV with set-top box) environments.

Under controller dispositions where all germane inputs are not automatically tethered by virtue of a software complement, the reader may appreciate that once all active soft-buttons 603 and germane input configurations, including sensor articulation, are associatively paired, in accordance with an embodiment, a user may commence game play whilst leveraging a more precise and robust (remote) operational-controller influence, as ushered by the present invention. This level of controller convenience and advancement, as transitioned to a mapped touchscreen environment and made possible by combining a touchscreen and sensor-input interface in one device, may prove appreciably valuable to the subjected user. Especially when a specialty touchscreen-and-sensor based input controller is potentially combined with the unique delivery system of the innovative gaming console headlining this application (in a complement of mapping harmony). Further exploiting the touchscreen-based limitations traditionally associated with vanilla mobile gaming.

Introducing now a kindred touchscreen controller embodiment that further describes a wireless input controller 601 with its own touchscreen and/or touchpad 604 interface, herein comprising, without suggestion of limitation, an at least two-ring 611 system (FIG. 6B) of remote finger and/or finger plurality input. A system is described that, exempli gratia, fluently permits for the remote reproduction of a finger swipe and/or tactical actuation of a targeted screen coordinate (e.g. a particular soft-button) virtually. Reproduction that may prove particularly useful in certain controller environments that may benefit from the technology. Under the disposition of such an exemplary controller environment, the at least two digital rings 611 are serviceably injected into a touchscreen's virtual rendering, such that, without suggestion of limitation, a singular graphical ring 611 may be digitally inserted into both corners of a touchscreen (befitting the expression of a two-ring 611 system in certain controller environments) as a game is being rendered; with each digital ring 611 potentially and respectively associated with a manipulated left 612 and right 613 hand of the user (not the subject of illustration in 6B). Each remote ring 611, by way of adding further colour to an embodiment, may be prone to manipulable influence by subjecting a user's respective finger of an active hand across both a touchscreen or touchpad interface 604, whichever may be present, of a wireless input controller 601 in an analogous fashion. Scale may be dependent on the engaged controller scenario.

Therefore, in further instance, if a user was targeting a soft-button on the left-hand side of a remote touchscreen, a user may simply place a finger of his left-hand (most proximal) on the left-hand side of the touchscreen or touchpad interface 604 associated with the wireless input controller 601, thus controllably engaging the left virtual ring 611, respectively, for purposes of manipulating an actionable object to fruition. Dragging an object, actionable actuation of an object, pinching to enlist a touch-screen's zoom features and the procurement of an act of drawing, in naming but a few examples of potential modal input functionality of the present embodiment, without suggesting limitation. Graphical representations such as an at least two-ring system illustrated in the diagram may see variant depictions such as, but not limited to, the introduction of a four-ring system that digitally tracks a user's pinching motions, where coveted in a controller environment, under a similar left-and-right sided ring layout. Besides virtual ring 611 influence via the touchscreen or touchpad interface 604, a tracking camera—or by any other means serviceable—may be employed in a divergent iteration. Manipulation of a virtual ring may occur on an asymmetrically-scaled basis; whereas a traversed hand gesture that extends 12 inches in the air and is captured by a serviceable camera, exempli gratia, may result disproportionately in the digital ring 611 only moving one inch on the display of the external media in order to account for the small footprint of a touchscreen device and to allow a user more liberal gesture disposition. It may also account for scaling consideration between a relatively small touchscreen device's video output in the midst of comparison and a large HDTV's display or video output; easily manageable under a governing software influence.

Upon initial manipulable ring 611 engagement, in the continuation of an example set forth and without suggestion of limitation, the user may then proceed to manipulate the virtual ring 611 until it is digitally superimposed over a touchscreen area—such as, at least partial superimposition of an actionable object—of the host device that the user intends to actuate with his fingers (remotely). This controller disposition may prove particularly useful, exempli gratia, in a touchpad-based wireless input controller 601 operating environment and/or when one or more camera(s) are involved for purposes of tracking a trackable input such as an input gesture (e.g. hand, finger, body) reliant on a virtual ring 611 system of an output display device in order to facilitate manipulation of an actionable object. Once then that the intended at least partial superimposition between a digital ring and a targeted digital soft button is achieved, continuing on with the example of a touchpad interface, a user may simply lift and then quickly retouch his or her finger in a proximal area of a touchpad to indicate intended actuation of an actionable object at the active coordinate of the digitally superimposed ring 611. An at least two-ring 611 system, as illustrated, may be virtually tethered to a memory-return system according to a timer, if so coveted, that sees each ring return to a position of (e.g. a proximate corner) rest once a user has completed actuation and/or may see rings remain in its most recent position and be "teleported" to a new location upon new finger placement on the input controller's 604 touchpad interface (or have the ring digitally be removed temporarily until re-activation occurs by the renewed control input of a finger), although such examples in no way intend to suggest limitation of any serviceable system, in the spirit and scope of this discourse, and merely serve as descriptive fodder to a particular touchscreen controller embodiment. Moreover, a kindred iteration of the at least two-ring 611 system, provided by way of a further non-limiting example, may also introduce a two-hand 614 system (See. FIG. 6B) where a remotely manipulable, semitransparent set of fluid or elastic digital hands 614 (mimicking the full fluidity of hand gestures in verbatim) may supplant—or complement in co-operative game play, e.g. where two players play at once using two separate input controllers—the described at least two-ring 611 system of an input controller environment. Whereas the at least two-ring 611 system of a governing touchpad influence may require user-manipulated orientation or re-orientation prior to actuation, a wireless input-controller with a specially built-in touchscreen interface is precise in nature and does not require manipulable orientation or mapping entry between input gestures since each display is identical and promotes precision and instantaneous mapping (e.g. if a user touches graphic A on the touchscreen of said controller, graphic A on the touchscreen display will be immediately mapped and virtually actuated in response). The specialty controller can truly transition well to such an environment, especially when a touchscreen's display is broadcast by the gaming console to a live output HDTV displaying its content prominently from across the room.

A wireless input-controller with a specially built-in touchscreen and/or touchpad interface may also exhibit a hardware footprint that too, allows it to assume the functionality of a gaming console 605 with its own downloadable content (actionable content; a form of external media), albeit in a far less robust deployment than the larger gaming console of the present invention, where serviceable to a controller environment. In such a case, a complimentary intermediary device (not shown) may help the described pocket-sized console support a broadening of services and features. Further to, in a divergent iteration, said wireless input-controller may comprise a slot for receiving an independent touchscreen user device; supplanting the need for construction of an innate interface.

For attachment-based interfaces injected in an akin controller environment, an innate capacitive source and capacitive manager (e.g. part of an intermediary-transceiver device with overlay powered by either a voltage [battery powered] or current [powered by an electrical outlet] source, with the hardware preferably comprising a small footprint in its entirety; and the transceiver, exempli gratia, potentially designed for snapping on to the sides of a touchscreen device for the exemplary purpose of display suspension) may further be introduced. In accordance with this attachment-based iteration, influence of a wireless input controller's 601 independent touchscreen 604, for instance, may electronically influence the capacitive manger to replicate a "mirrored" capacitive discharge, supplied by an innate capacitive source, at a targeted point or points of actuation on an overlay, in the spirit and scope of the inventive discourse.

Figure 7A:
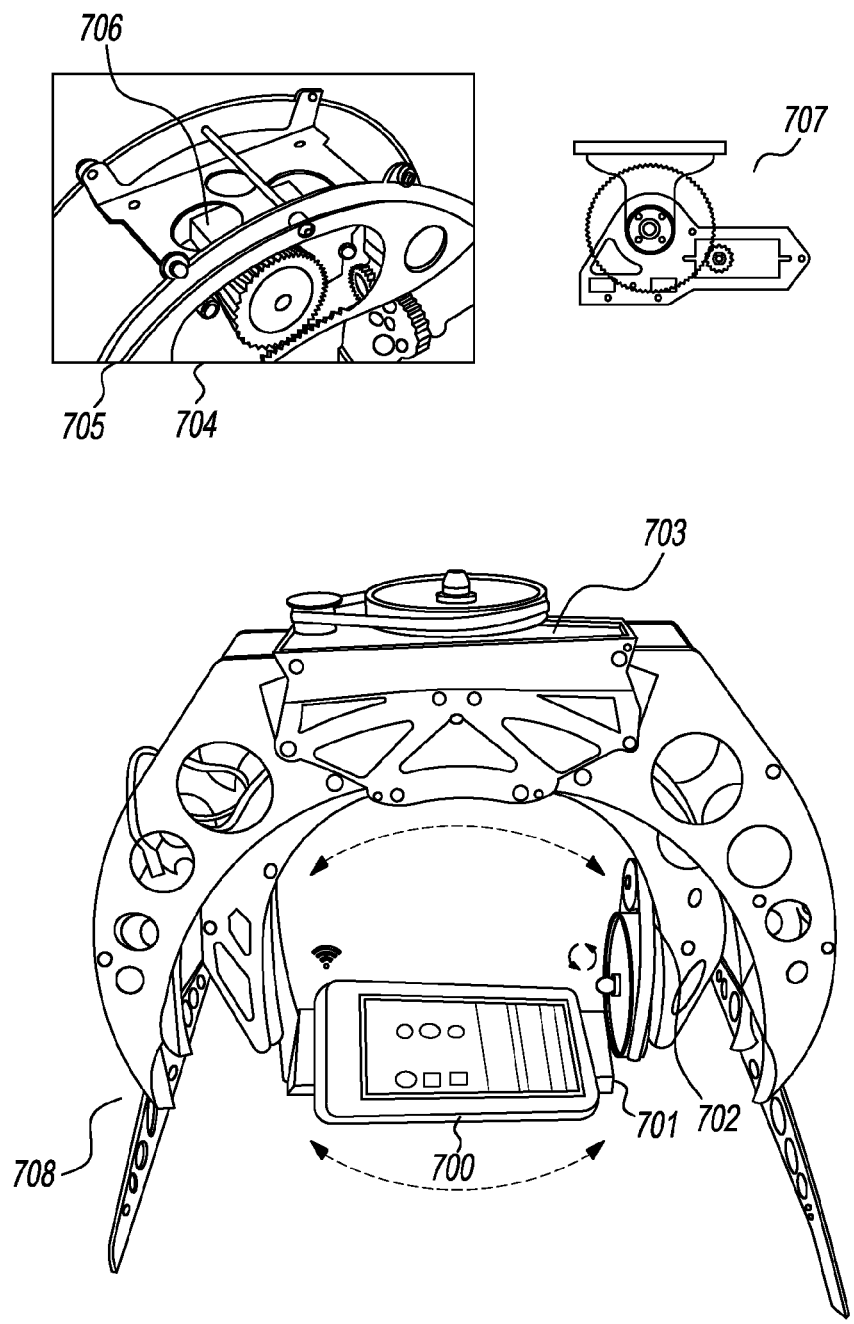
FIGS. 7A-B illustrates a mounting apparatus, in accordance with an embodiment, designed to mechanically reproduce omnidirectional manipulation to, and input-sensor manipulation of, an allied touchscreen device; including the potential for horizontal and vertical traversing at the attachment base. Said manipulation is in direct and faithful response to the original transmitted directives of a remote input controller; the potential for integration into a gaming console 101 with allied touchscreen device 102 being obvious.

By way of a non-limiting example, FIG. 7A offers a mechanical method and assembly that makes remote manipulation of an actionable sensor input or sensor input plurality embedded in a touchscreen device possible. Those skilled in the art will understand and appreciate the actuality of variations, combinations and equivalents of the specific embodiment in terms of serviceable sensor manipulation and particularly in regards to potentially disparate apparatus assimilation—while still remaining faithful in reproducing any coveted manipulable act by mechanical manipulation—into a video-game console 101 for allied touchscreen devices 102. According to an embodiment, FIG. 7A represents a mounting apparatus 708—a host device equipped with an influenceable or manipulable platform 701 that may be subject to bidirectional and/or omnidirectional movement; the manipulable platform 701 unto which a viewable touchscreen device 700 sits securely mounted—comprising, without suggestion of limitation, a structurally supportive apparatus where 2-axis gimbals reside. Whereas a servo plurality (guided by a microcontroller unit) are respectively enlisted to provide for controlled movement (based on variables such as positioning, tracking and a target determination for the influence of a sensor input) to each axis. A servo motor, in preamble, is a small electric motor that usually includes a built-in gear train capable of spinning an associated gear (see FIG. 7A, 707) upon introduction of an electrical current (the electrical current engaging the servo motor or servo motor plurality may be supplied by a voltage source or a current source). The gear, in turn, drives other devices such as, but not limited to, a servo wheel assembly for transitional influence (e.g. the manipulation of an actionable sensor input built into a touchscreen device) into a touchscreen-based controller environment. An intensely tweaked and tested gyroscopic mechanism, as constructed and manipulated by the inventor in a touchscreen environment, has contributed to the related discourse. The viewable touchscreen device 700 may be mounted on a bi-directional platform 701, without suggestion of axis or related limitation, and subjected to the influence of, as a case in point, both an inclined front-and-back servomechanism 702 and left-and-right servomechanism (see 704, 705, 706 of a serviceable left-and-right gear design associated with a primary mounting apparatus 708) and their associated gimbals.

Figure 7B:
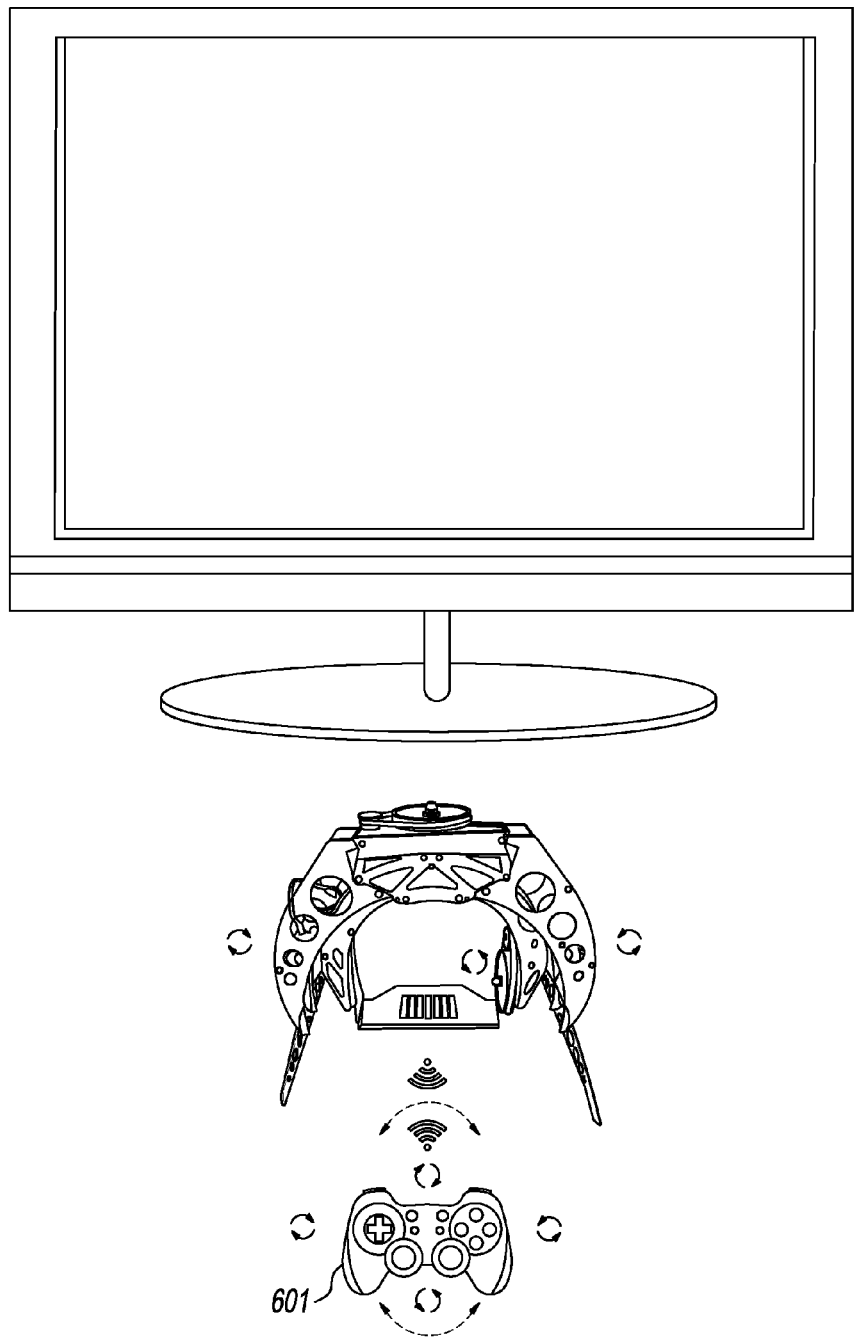

For added directional versatility of a mounted touchscreen device 700 beyond that which is bi-directional, an additional servo motor and axis gimbal may, for example, be enlisted, if so inclined in a controller environment. For purposes of not unduly burdening the description beyond bi-directional disposition, however, a left-and-right servomechanism design (see 704, 705, 706) is not be incorporated into the lower figure and instead it is serviceably replaced with a panning servomechanism 703 structure mechanically designed to spin or revolve the linked platform 701 (and by association, the mounted touchscreen device) in a 360-degree range of motion—in both directions—by any serviceable means of mounting the respective gimbal into action on a corresponding servo axis. The input controller (FIG. 7B, 601), remaining wirelessly paired to the servo assembly, may comprise its own electronic sensors, including, but not limited to, proximity, accelerometer and device-positioning sensors, such as use of a gyroscope, for directive relay by an integrated circuit to the associated microcontroller assembly of the primary mounting apparatus 708 for a reflex reproduction. A microcontroller may, exempli gratia, calculate an input controller's (FIG. 7B, 601) sensor-based angulation directives as they are broadcast, upon which the calculated directives may then be instantly and faithfully relayed to the respective servo or servo plurality in order to reproduce the angular adjustments (with the wireless input controller's 601 angulation directives or gestures serving as the model of reproduction for any reflex, gimbal-based mechanical influence), under servomechanism influence, to the bidirectional platform 701 of a mounting apparatus 708, and hence, the mounted viewable touchscreen 700 device (and its respective input sensors) in association. A method and assembly of mechanically mapping an angular-motion (gestured remotely) to a touchscreen user device is thus introduced, permitting the manipulation of such gaming sensor inputs as, but not limited to, a gyroscope sensor from—in an exemplary suggestion of positional freedom and convenience—across the room.

The bidirectional movement of a 2-axis gimbal, as suggested herein, is designed to faithfully mimic, for instance, an angular reflex—such as an articulated gesture first produced by a manipulated remote wireless input-controller (FIG. 7B, 601) influence under the care and operation of a user—by mechanically reproducing said manipulation of the originating sensor input. Said differently, as a remote wireless input-controller (FIG. 7B, 601) communicably disseminates sensor-based input directives for positional assignment to each enlisted servo housed on the mounting apparatus 708, exempli gratia, as managed by a processor and/or processor plurality governing the paired assembly, remote and comprehensive manipulation of an actionable input is thus commissioned. Both the manipulation of an actionable sensor input and soft-button input given the plurality of mapping interfaces that may be present in a controller environment.

Assuming now the potential servo and gear-assembly depicted by arrangement 704, in an effort to facilitate reader understanding, as a user leftwardly (in reference to a left-handle metric) tilts the wireless input controller (FIG. 7B, 601) in a downwardly-sloping angle; a respective servo motor 706 (not the subject of illustration in FIG. 7B) is thus engaged, driving a gear assembly—with a serviceable gear ratio—to mechanically usher a fluent and timely translation of said controller gesture in reflex. Said mechanical reflex results in the left-and-right suspension arm 705, influencing a conspicuously mounted touchscreen device 700 by associative armature connection, traversing in a counterclockwise or "leftward" motion as per the coveted act of reproduction. Although not illustrated in arrangement 704 of the primary figure, a similar servo structure may, of course, be present in the mounting apparatus 702 to mechanically position for an alternate reflex action first initiated by a remote wireless input controller (FIG. 7B, 601), such as, by way of a non-limiting example, when the wireless input-controller (FIG. 7B, 601) is rocked or gestured from front-to-back in order to remotely manipulate the sensor orientation of a touchscreen device 700 by mechanically jockeying its front-and-back end, under servo influence, respectively.

The wireless input controller (FIG. 7B, 601) and its innate sensor inputs may, in accordance with a divergent iteration and a bi-modal mapping interface, be synced directly with a viewable touchscreen device 700 under the absolute governance of a software-based interface in order to enable remote manipulation of both a sensor input and/or an assigned soft-button controller system (or controller plurality) electronically, by virtue of a wireless tether. A mapping interface (e.g. that responsible for the remote manipulation of a divined sensor) associated with the gaming console of the present invention may also be a software-based interface, this in accordance with a disparate embodiment to that of a described mechanical influence (e.g. FIG. 1, 103) of the present invention.

A similarly-purposed iteration may include a mounting apparatus 708 with a plurality of servos and tilting rotors capable of subjecting a viewable touchscreen device 700 to omnidirectional movement, indeed, including both horizontal and vertical traversing at its base. Horizontal and vertical traversing at its base, according to a non-limiting example, may comprise an omniwheel (e.g. rotacaster) apparatus and holonomic drive system used to mechanically reproduce an original input of linear acceleration, which is, of course, not intended as limiting language as any means serviceable to reproduce an omnidirectional influence (either mechanically and/or in accordance with a variant iteration subscribing to a method and assembly of virtual influence) is serviceable to the present embodiment. The divining of linear acceleration data in a controller environment by a sensor intermediary may be factored into the act of reproduction by the console's mechanical apparatus. In a potential manufacturing build design, exempli gratia, a bottom-mounted circular ring may act to limit the omniwheel apparatus' field of movement (acting as an "umbilical" tether for both its horizontal and vertical traversal range). Adding to its diversity of motion influence, in further instance, a mounting apparatus 708 or apparatus plurality may reiteratively comprise an omnidirectional 3-axis disposition (although not requisite and not specifically addressed in the figure) whereas a third servo is added that employs an integrated shaft attached to, for example, a strategic servomechanism 702 to permit the coupled servomechanism to spin in a previously unaccounted for 360-degree motion where germane to gaming metrics of a particular gaming title.

Furthermore, the incorporation of direct-drive motors and accurate encoders (e.g. in an assimilated omnidirectional base 103 of a video-game console for touchscreen devices) for superb responsiveness and pointing accuracy in the manipulation of an actionable sensor input are also serviceable to this discourse. Adding breadth by example, the direct-drive motorized gimbal assembly, exempli gratia, powering a plurality of gimbals in an alternate embodiment (not illustrated), is structurally and respectively coupled to an encoder assembly and a counterweight system for fluent application in the spirit and scope of this discourse. Under this embodiment iteration: gears, flexible couplings, timing belts and virtually all conventional sources potentially attributed to positioning error, potentially present in a mechanical-drive system, are absent. Under such a method and assembly, rotational "reflex" may also occur more rapidly, without the need for the manipulation of gear ratios. Moreover still, high precision, angular contact bearings—yielding minimum friction and zero-bearing clearance—may further be strategically implemented in a controller environment to help bolster associational accuracy of, and a user's experience associated with, a remote wireless input controller device conjugately assigned, in a series, to facilitate a reflex manipulation of an actionable sensor input in communicable touchscreen devices.

Brushless, linear direct drive servomotors, as well as ball-screw iterations driven by either brush or brushless rotary motors, may also be suitably adapted for achieving the desired purpose of physical (e.g. angular) or mechanical manipulation of a touchscreen device (and its associated sensor inputs) in response to a remote wireless input controller influence and further serves to illustrate the breadth of serviceability of an embodiment involving the remote manipulation of an input sensor or sensor plurality housed in an equipped touchscreen device. A rail system and series of gears could, in further exemplary discourse, readily be assimilated to accomplish gimbal-based servo travel of +/−90 degrees and rotation of the inner gimbal ring by +/−55 degrees, without suggestion of limitation, under a pitch mechanism directly driven from a servo supporting reflex speeds. The servo motors may be governed by a servo processor and/or sequencer comprising the controller interface and may be powered by a voltage source or a current source. An associated potentiometer or serviceable positional sensor responsible for positional feedback and an akin digital control assembly may, where coveted, further be introduced into a controller environment for touchscreen devices. This iteration too, being governed by a servo processor and, like other exemplary discourse, may be responsive to the input gestures of an input controller (FIG. 7B, 601) wirelessly paired with the servo interface for the primary purpose of communicating sensor-based directives or reflex gesture relays for the remote manipulation of an actionable sensor input.

Ball/socket armature comprising threaded or non-threaded rods and stepper motor integration with standard RC servo mounts—as a variant embodiment in point and readily understood by those skilled in the art as also being serviceable in configuration to the advancement of angular (and directional) mimicking in the spirit and scope of this discourse—is further introduced. Such multi-rotor frames may be fitted with a serviceable microcontroller board that adroitly manages the servo outputs and the respective gimbal assignments, where incorporated. A divergent gyroscopic mechanism operating under a piston assembly, to suggest further breadth and scope in achieving a common manipulative task, may also be successfully deployed in a touchscreen-controller environment. The multi-rotor frames, including any related components such as the armature, along with the positioning of servos in both the illustrated and non-illustrated dissertation, may, of course, vary widely from the associated figure and the serviceability of descriptions herein while still honouring the spirit and scope of this discourse. Further, any structural arrangement of a positioning mechanism or mechanism plurality permitting faithful orientation (such as, that being capably inclined for movement in all directions) in response to the influence of an associative torque and/or a similar ascendency, may be serviceable to the present invention.

Collectively, all servo motors and/or any intently designed serviceable positioning mechanisms falling under the scope of embodying matter herein, will serve the common purpose of offering a touchscreen user a ground-breaking method of remote input-controller influence of, and/or interaction with, a touchscreen device and any of its responsive controller sensors (sensor inputs), such as, but not limited to, the accelerometer, gyroscope, magnetometer, proximity, orientation and/or any serviceable touchscreen-based sensor input or input plurality, including those with applications beyond positioning sensors, innate to the touchscreen device and in the spirit and scope of this discourse. Preferably all servo motor applications and serviceable positioning mechanisms will comprise components that operate in a quiet manner as to not interfere with potential voice-command integration in a controller environment. As previously stated and repeated here again for emphasis, a video-game console 101 component for touchscreen devices 102 may, of course, also comprise a non-mechanical platform reliant on an electronic sensor and microcontroller assembly, in the replacement of a mechanical platform (e.g. one premised on servo and gimbal assemblies), for the virtual management and manipulation of an actionable input sensor, such as with a gyroscope and/or accelerometer potentially innate to a wireless input controller as the originating input, the gaming console 101 component (e.g. to mediate mapping of the sensor in a series) and/or a touchscreen device, where coveted to a controller environment.

A software-based system of live output occurring remote from the touchscreen device 700 and/or a physical AV cabling disposition (e.g. with a rotating connector or connector plurality, FIG. 8B) may be employed in a mechanical environment where coveted, as may be a peer-to-peer wireless screencast standard formed via Wi-Fi Direct connections in a manner akin to the use of Bluetooth; as per divergent wireless iterations supplanting the need for a type of AV cabling. To suggest further breadth of serviceability still, a camera may be integrated and designed to frame the display contents of an aligned touchscreen device 700 and may see its viewable content transmitted (as a live output) to a serviceable broadcast agent such as an HDTV by any means serviceable. In this particular method of a camera-based live output display, an additional camera may be employed to capture a controller interface using a completory screen-parsing application—although unlike in FIG. 5, the screen-parsing application is under the governance of the video game or gaming console 101 and the parsing occurs on a non-actionable surface such as the camera captured field of a live-output device (e.g. a non-touchscreen based standard definition TV with a mapping complement). Granted, this results in an atypical implementation but is nevertheless stated here by the inventor to add emphasis to potential breadth of disposition.

FIG. 8A, in accordance with an embodiment and building off the annotation of FIG. 1 or any serviceable subrogate, represents the exterior structure of an omnidirectional base 103 component (a serviceable omnidirectional platform 103 stationing an allied touchscreen device 102) of a video game or gaming console 101 for allied touchscreen devices 102. The omnidirectional base 103, as understood from the teachings of the present invention, is primarily designed to mechanically manipulate, under an omnidirectional influence, the mounted touchscreen device 102 of a video-game console 101 with allied touchscreen device 102 and thereby manipulate the associated input sensors of said touchscreen device 102. Input sensors such as, by way of a non-limiting example, accelerometer, gyroscope, magnetometer, proximity, orientation and/or any serviceable touchscreen-based input sensor, are thus purposefully prone to a mechanical omnidirectional influence; a mimicking reflex in accordance with an originating remote input-controller influence, as discussed in the related discourse herein. Mechanical influence of an omnidirectional base 103 may include, in a suggestion of breadth of serviceability by example, a plurality of collapsible terminus—e.g. at left, right, top and bottom peripheral regions of the face of a base—to introduce a transitory tilting influence on a mounted touchscreen device 102. Expanding further on the use of an accelerometer as a tilt sensor, exempli gratia, the reader notes an operating environment may also comprise a system of compensation for any delays resulting from the invoking of a low-pass filter in a noisy accelerometer environment. Combining data from both a gyroscope and accelerometer together may, as a case in point, serviceably overcome a noisy environment for fluent tilt sensing and the omnidirectional base 103, equipped with an ability for sensor coalescence under a serviceable sensor management tool, is capable of faithfully transmitting the product of the original tilting to a remote touchscreen user device via mechanical influence. A system of mechanical influence may, of course, benefit from the use of at least one serviceable and coalesced algorithm. With references of mechanical influence, of course, not intended to suggest the preclusion of a virtual propensity in the spirit and scope of this discourse, as a (software) virtual-based sensor influence may readily supplant said mechanical influence.

FIG. 8B describes an anti-twist connector apparatus 810 designed for attachment to a manipulable device, such as a touchscreen device 811 under omnidirectional-base 103 influence, this in accordance with an embodiment. The anti-twist connector apparatus 810, as its name suggests, is engineered to help prevent the occurrence of wire twisting during the course of said apparatus being subjected to a recurring mechanical influence. The reader notes that in order to help prevent the occurrence of wire twisting—particularly in reference to a wired live-output implementation presently discoursed as per a non-limiting example—an anti-twist connector apparatus 810 may be dually assigned to tether between, where applicable, both an input controller on one end of the video-game console component 101 and an output device on the other end of the video-game console component 101—in a layout similar to the structure of a traditional video-game console.

The video-game console 101 component is designed to accommodate an allied touchscreen device 102 counterpart such that, exempli gratia, the allied touchscreen device 102 securely resides on an omnidirectional base 103 equipped for mounting. Granted an intermediary cable may be employed on both ends of the video-game console component 101, however, in order to facilitate and simplify understanding the focus is presently on the live output end. Accordingly, one end of the intermediary cable may serve as a manual connection point to the targeted connector of an allied touchscreen device 102 (known to be securely mounted to the omnidirectional base 103) responsible for addressing live output and, on the opposite end of the intermediary cable, it sits internally fastened to a fixed connector mounted to the frame of the video-game console component 101 (not shown) of the present invention. Thus, as a user inserts a serviceable end of the HDMI AV extension cable 812 (e.g. the Component and/or Composite AV cable 812) into the external (that is, showing externally from its frame mount) or opposing side of said fixed connector, an "AV circuit" is seamlessly engaged with the assistance of a respective intermediary cable espousing the connector ends. Positioning and design of a touchscreen device's live output connector system may, of course, vary widely from the present discourse while still remaining serviceable to its spirit and scope. Furthermore, the video-game console 101 for allied touchscreen devices 102—upon communicable receipt of A/V broadcast directives from the touchscreen device—may further comprise a wireless transmitter and microcontroller unit capable of broadcasting received A/V directives, where equipped, directly to an output display device, such as, but not limited to, an HDTV or Ultra HDTV, a computer monitor and/or virtual eyewear such as standard and 3D glasses and/or goggles worn by the user, remotely. Free and open source media player applications, by way of example and not limitation, may also be supported by the console for live output transmission of related media content.

In order to account for the mechanical manipulation of a touchscreen device's gesture input sensors by omnidirectional influence (since the touchscreen device may sit stationed on an omnidirectional apparatus subjected to omnidirectional influence), while attempting to minimize or remove completely the incidence of traditional wire tangle upon engagement, the intermediary cable end associatively connected with the touchscreen device's live output end, may comprise both, exempli gratia, a 180-degree swivel 810 and a 360-degree rotating HDMI-connector 810 connector interface. The anti-twist connector apparatus 810 expressed in FIG. 8B; suggesting a practical design that may help prevent the incidence of incommodious wire twisting, is, clearly speaking, merely intended to be diagrammatic in nature and not intended to suggest limitation. In alternate connector iterations suggesting breadth of serviceability, exempli gratia, the introduced electrical connector also being subject to omnidirectional manipulation, may rely on a multi-pin system. An exemplary design capable of bending 90 degrees, where coveted, a system such as, but not limited to, a slip-ring and/or ball-bearing system of interconnectivity may be employed. A retractable wire/cable assembly, in further exemplification, may also prove useful in certain anti-twist initiatives for wired deployments.

The intermediary cable may also, if so coveted, be manufactured in a manner reproducing the corded behaviour of ringed telephone wire to provide additional degrees of flexible latitude, in the spirit and scope of this discourse; a design implementation which may further help to withstand the incidence of incommodious wire twist upon omnidirectional engagement of an attached touchscreen device. The side of the intermediary cable affixed to the frame of the gaming console for allied touchscreen devices, finds that the frame remains stationary at all times (e.g. it is not directly influenced by the rotational or omnidirectional influence from the gimbal, servo, rotor and/or piston influence, in naming only a few serviceable drive systems) while the other end is attached to the touchscreen device mounted on a manipulable or omnidirectional apparatus that remains fluent and prone to directional mechanical influence. In accordance with an embodiment supplanting the need for manipulation under a mechanical influence, an input controller for touchscreen devices may, of course, be synced wirelessly with the video-game console 101 unit of the present invention and/or a mounted touchscreen device directly for the manipulation of, exempli gratia, actionable soft inputs—including a sensor input—using a prescribed mapping system and/or under an attachment interface reliant on a capacitive source (either a user's touch input and/or from an independently manufactured source, such as through an intermediary transceiver device previously described).

The present embodiment, by way of a further non-limiting example, may be broadly influenced by a propensity for greater wireless integration measures, as first proposed heretofore, even to the point of a preferred model becoming wholly wireless in all salient component integration. In reference to greater integration measures, a wireless remote input-controller may be wirelessly paired (e.g. via Bluetooth and/or an associated protocol) to the video-game console 101 component responsible for the activity of its omnidirectional base 103 (equipped for both mechanical and virtual implementation of given input directives) and/or the allied touchscreen device 102 directly, for purposes of manipulating an actionable object and/or actionable input (including actionable sensor inputs). The gaming console 101 of the present invention, as iterated, preferably comprises innate electronic hardware and/or a productive software counterpart to facilitate serviceable electronic mapping directives and translation of all serviceable inputs (e.g. in response to servicing the directives of the wirelessly paired remote input controller with input sensor[s]) associated with the allied touchscreen device 102, in the spirit and scope of this discourse.

A remote wireless input controller may too, without suggestion of inter-connectivity limitations amongst an assembly of paired components, directly connect to an allied touchscreen device by virtue of a serviceable software-based mapping interface—and the touchscreen device may be selected to broadcast its manipulated A/V output directly to a remote output display device—however, integrating these features (and potentially substantially more with a feature-rich and continuously evolving console) in an independent and facilitative video-game console platform for touchscreen devices deemed familiar to users (since it borrows from the traditional gaming console expression) may prove highly popular to consumers. Value-added features, such as, but not limited to, an intuitive menu system, automatic device and touchscreen-interface recognition upon selection of an external media gaming title or app, NFC synching, upgradeable firmware and/or component drivers made automatically available to the console (e.g. further provisioning an environment highly capable of task automation) may vastly improve controller compatibility, convenience, utility amongst a library of gaming titles offered to the touchscreen device, gaming uptime and, of course, the user experience.

Moreover, the present invention's gaming console 101 with allied touchscreen device 102 may further serve as an all-in-one entertainment hub, comprising an Internet gateway with access to on-line content and browsing, potentially including converging social-networking, news and media feeds with an app-based interface, cloud-based computing, VoIP propensity, multiplayer play, a TV tuner and full set-top box and IPTV functionality with a recordable storage media option embedded in the device. Compatibility with alternate OS games, such as those on DVD or compact disc for a desktop environment, the ability to play music and/or movies from an external media source, the porting and/or programming of competitive and/or unique gaming titles specifically designed for use with the innovative gaming console 101 introduced by the inventor herein, and the like, are all potentially inclusive—without suggestion of limitation—of the offered functionality in a manufactured product. External media comprising a ported DVD title, by way of example, and not limitation, may operate without the need of an allied touchscreen device; as the present invention may also act as a traditional gaming console where coveted. Beyond pairing wirelessly, a remote input controller may, of course, connect through alternate interfaces, such as, but not limited to, a device's dock connector assembly directly by virtue of a software complement.

Figure 9:
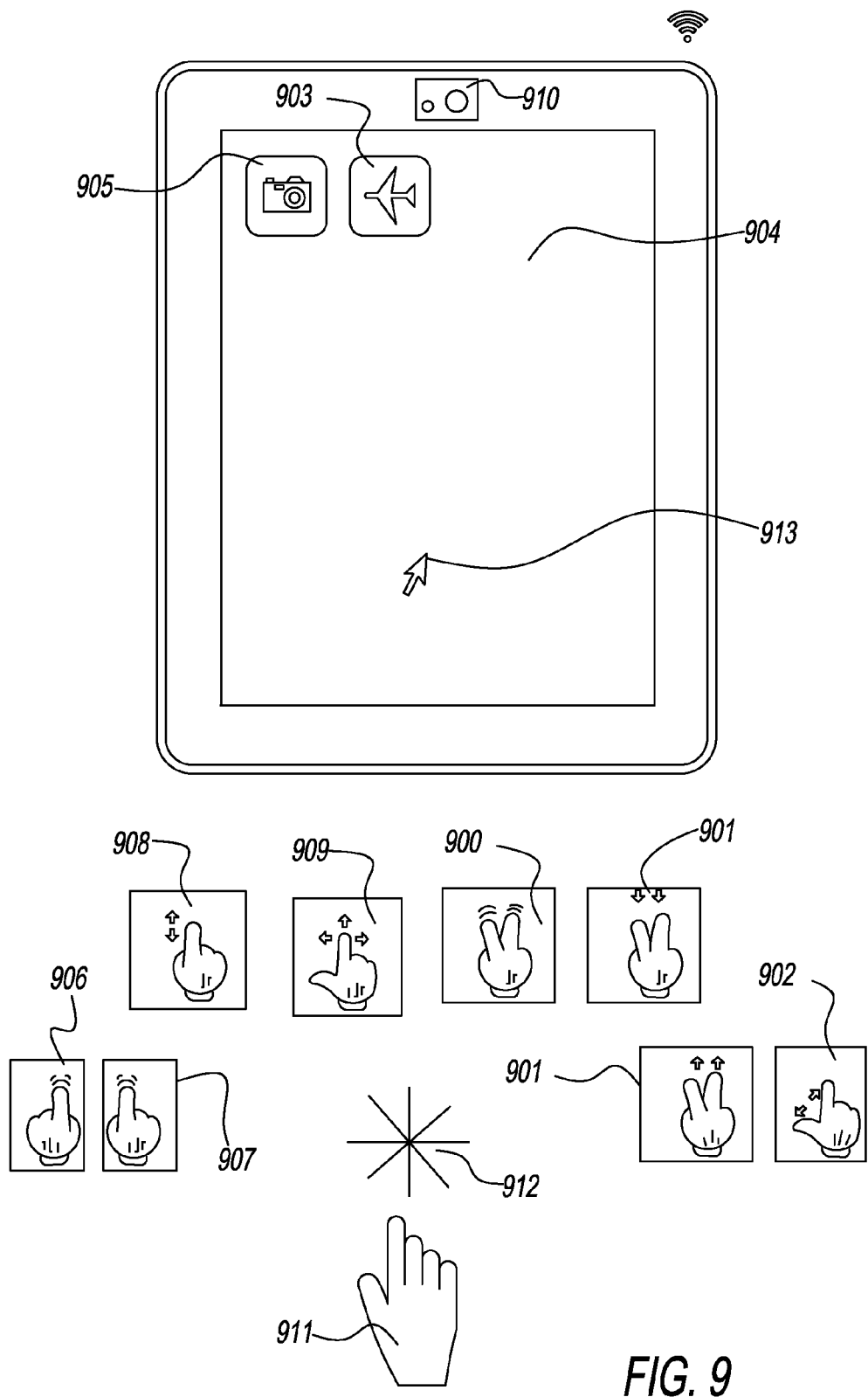
FIG. 9, in accordance with an embodiment, illustrates a serviceable input system of a video-game console for allied touchscreen devices that leverages an associated camera to interactively track, without suggestion of limitation, a user's fingers and integrative gestures in assuming and influencing the position of a "mouse" pointer.

FIG. 9 illustrates a mouse-type input system that leverages an associated camera 110 of a video-game console component 101 and/or a touchscreen user device 102 (or any serviceable camera—plurality in related iterations) to track an user's finger and/or finger plurality and any serviceable gestures under the administration of hand articulations, that may, exempli gratia, assume and manipulate the position of a "mouse" pointer (and actionable sensor with the administration of, for instance, clutch gestures) in accordance with this exemplary discourse. A mouse-type input system may thus designed for transitional modal integration into a touchscreen environment. Beyond that of any serviceable hand articulation, the reader notes that any recognized input gesture or gesture plurality germane to an operating environment—including camera-dependent integrative-body gestures not limited to the exemplary mouse-type system of input—is to be considered embodying matter herein. Touchless user interfaces commanding a touchscreen user device via the use of body motion and gestures without physically touching a screen or controller input is, in fact, germane to many controller environments.

In a method of operation under the described embodiment, to lead the discussion by example, a finger and gesture-tracking app 905 is designed to launch (and attune with) an associated camera 910, 110 for purposes of capably tracking a user's 911 accredited finger path 912, hand articulations and an aggregation of associative gestures. The finger and gesture-tracking app 905 may comprise a distinguished inventory of gestures and finger derivations under its recognition umbrella, with said inventory available to the user for purposes of, for example, engaging a mouse pointer 913 on the touchscreen 904 of a touchscreen user device, and/or may comprise a feature capable of learning new input commands entered and then saved to the software's repository and/or the internal-memory of a gaming console 101 device by a user. New input commands may consist of a single gesture or a series of gestures, perhaps prompted by a camera pose and/or pose series, and the user may be required to choose what actions the new input commands will be associated with. Sensor calibration, by any means serviceable, may also be required in certain controller environments where, exempli gratia, administration of new input commands occurs. The gesture-tracking app 905 may run concurrently with other active software, thus affording real-time and concomitant gesture integration with the governing software into its rendering environment (by virtue of both the software and any CPU-based processing of an integrative input such as a tracked finger path 912 and/or recognized set of associative gestures). The finger and gesture-tracking app 905 may not be requisite, of course, in a controller environment where the primary gaming software is programmed to autonomously decipher and incorporate camera-based gesture recognition directly into a gaming environment. And while the exemplary illustration focuses on an associated touchscreen-based camera 910, an associated camera 110 of a video-game console component 101 to which said touchscreen device may be allied is, of course, highly transitional in nature to the present discourse.

For instances of assuming mouse-like behaviour in tune with this embodiment, a mouse pointer 913 may be dragged across the touchscreen 904 to, for instance, a targeted actionable icon 903 for its virtual selection via the influence of an integrative user-based input. An integrative user-based input may, exempli gratia, be associated with a manipulated finger path 912, an accredited hand and/or finger articulation or plurality thereof and/or an aggregation of associative gesturing beyond that of hand-based input for the intended manipulation of actionable soft elements, including any preordained input sensors that may be prone to virtual manipulation in the spirit and scope of this discourse, articulated by a primary software application; as actively hosted on a touchscreen device. Said another way, a user may control a primary software application, program and/or script—such as one that allows control of a user desktop PC remotely from the touchscreen 904—by using nothing more than, exempli gratia, an associated finger input. Under the watchful lens of an associated camera 910, 110, control-input gestures, such as the tracking and reproduction of right-click and left-click functionality, are readily spirited into the execution of a software program for virtual mapping translation to an actionable input. Mapping hand/finger articulations and/or accredited gestures for, to suggest by way of example, corresponding soft-button (not suggestive of an actionable-input limitation) actuation remains fluent in accordance with the present embodiment.

Accredited finger articulations such as, but not limited to, a user 911 tapping a finger of the left hand downward 906 at a point of mouse pointer 913 orientation (with the left hand potentially representing the left-mouse button in continuance with the exemplary theme of desktop control cited previously and the downward motion of an articulated finger input representing an intent of actuation) and, conversely, the tapping of a finger on the right hand downward 907 in similar articulation (representing the right-mouse button) may be readily discernible and integrated into a touchscreen 904 environment (in a form of electronic, digital and/or virtual "actuation", thus replacing the traditional need for the capacitance-bearing control input of a finger in the manipulation of an actionable object) by the tracking and/or mapping software associated with the camera 910, 110 of an allied touchscreen user device 904 and/or video-game console component 101 respectively. Up-and-down motions 908, omnidirectional motions 909, double taps 900, two-finger directional swipes 901 and pinching motions 902 may, for instance, comprise a partial list of recognizable input-driven commands in a given tracking inventory that may serve in the manipulation of an actionable input in a motion-sensing application.

Tracking agents, such as specially-designed discovery thimbles and/or the use of motion-activated controllers (e.g. motion-input or gesture-sensing controllers designed to be clutched and manipulated by hand) for precision tracking purposes, could also be readily added to a serviceable modal input of the present invention, according to an example set forth, to suggest an extensive potential for breadth in disposition. Moreover, input sensors, such as, but not limited to, gyroscopes (producing an output of angular velocity) and accelerometers—governed by positional influence and found in certain graspable motion-input controllers of the present invention—may further allow for the translation and incorporation of natural athletic motions and/or associated gesture inputs produced remotely to an associated software program serving as the external media (in respective reconciliation with its own actionable inputs) with great fidelity. With or without use of a gesture-sensing camera.

As suggested prior, the operating scenario may also be transitioned away from a mouse-type input system to any input-means serviceable to a congruous controller environment, including, as but one example without suggestion of limitation, accredited body mechanics and/or gestures performed in a sports-or-dance themed game for the intended manipulation of an actionable input interface (such as a soft-button and/or soft-button controller, a digital and/or any congruous input sensor implicated in action) and/or a non-actionable element by virtue of serviceable electronic tethering. Said another way, a virtual tether may occur between a serviceable touchscreen specialty-input controller and an engageable soft-based interface, although, exempli gratia, in the case of accredited body mechanics and/or gestures performed in a sports-or-dance themed game under the governance of a camera-based system, a physical specialty controller or tactile interface may not be requisite for game play. That is, with advanced image processing capabilities potentially inherent in a controller embodiment of the present invention, a camera apparatus alone may be capable of serviceably processing input-based gestures for reconciliation with a known (e.g. programmed) inventory. Image processing capabilities may require, for instance, extensive use of algorithms and filters to identify and map a user or user plurality for digital assimilation based on the parsing of established personal dynamics such as their respective height, shape, clothing disposition, facial expression, hair style, etcetera. Both gesture, depth and voice recognition are integral to the advancement of image processing capabilities for a touchscreen environment; as are a technology footprint accounting for discrepant ambient light and noise environments that may be present in a living-room environment.

By way of example and without implying any limitation, FIGS. 10 and 11 illustrate a plurality of light gun and/or akin specialty input controllers transitionally designed for touchscreen operation, including a "micro-capture" or (finite) screen-capturing device. A "line-of-sight" (for instance, being serviceably linked by visually-guided manipulation) specialty-input controller may be designed primarily, at least in accordance with a potential operating scenario, for the manipulation of actionable on-screen objects in a touchscreen environment. The "micro-capture" or (finite) screen-capturing device, exempli gratia, serves as a specialty input controller and is used for articulated touchscreen registration of a communicable directive or directive plurality (by remote influence) upon broadcast engagement. A light-gun controller for actionable inputs 1000 is shown interposed into a touchscreen 1001 environment, in accordance with an embodiment. A light gun controller for actionable inputs 1000, that may serve as a remote touchscreen-input device or specialty-controller input device primarily targeting actionable objects prone to manipulable input, may represent a lightweight plastic controller comprising a processor, wireless transmitter and an image-capture device 1002 such as a digital camera 1002 equipped with an extremely narrow viewfinder frame.

By design, the viewfinder frame may only be capable of capturing a very limited image (for instance, a small section of the active touchscreen display of a touchscreen user device 1001 to which it is pointedly cast), with said viewfinder image positionally influenced by directing the lens 1003 of the light gun controller for actionable inputs 1000 for strategic screen capture, as per this exemplary discourse. A light gun controller for actionable inputs 1000, for instance, is wirelessly paired to a touchscreen user device 1001 featuring a compatible game title (and/or under the autonomous ascendency of virtual mapping software, thus extensively broadening game compatibility of the light gun controller assembly for actionable inputs 1000); upon user engagement of a projecting tongue or trigger 1004 at the handle top of a light gun controller for actionable inputs 1000, a wireless directive is instantly transmitted to the touchscreen user device causing its display portion to rapidly flash a panoptic alphanumeric rendering (without suggestion of limitation) uniquely identifying a specific touchscreen location depending on the navigated capture. In further description, upon application of a trigger 1004, the rendered output of a touchscreen sees an alphanumeric rendering instantly flashed by either the engaged game and/or correlative mapping software (at a fraction of a second, an interval not even discerned by the user) across an entire touchscreen for related processing.

To better facilitate reader understanding, an exemplar rendering of a touchscreen's panoptic "flash print" may comprise, without suggestion of limitation, the following set of alphanumeric characters for parsing: "a1a2a3a4a5a6a7a8a9a10b1b2b3b4b5b6b7b8b9b10 . . . z1z2z3z4z5z6z7z8z9z10". An encompassing flash rendering such as this is immediately anatomized by a microprocessor and/or engaged software program into correlative screen coordinates for related processing and, in conjunction with the simultaneously captured snippet image of a limited geographically-identifiable alphanumeric rendering by a light gun controller for actionable inputs 1000, a process of cross-referencing occurs instantly to determine an exact location captured on a touchscreen 1001. With the exact location coordinate captured by the process of touchscreen anatomization, a mapping software complement, exempli gratia, present on a wirelessly synced video-game console 101 unit and/or the allied touchscreen user device 1001 (and/or present on a touchscreen user device 1001 being used independently thereof), can then actualize the manipulation and/or engagement of an actionable object at a highly precise captured location (that "photographed" or captured by the limited viewfinder of the lightgun device 1000) on the touchscreen 1001, accordingly, during the course of game play. Actionable inputs comprise actionable objects and the use of such terminology is not suggestive of limitation. A light gun controller for actionable inputs 1000, exempli gratia, may comprise sensor inputs that too, in borrowing from the expression of FIG. 7A, additionally permit for the remote manipulation of an actionable sensor input or sensor input plurality embedded in a touchscreen device (and not just for the remote manipulation of actionable objects as has been the primary focus of the related discourse).

To expand on this discourse further, if a light gun controller for actionable inputs 1000 pointed at a touchscreen user device 1001 captures, as an example, the flashed (again, injected at a rate imperceptible to the human eye) digital-image snippet 7a or z7 of the alphanumeric rendering noted in the embodiment herein (reiteratively, the image captured within the limited range of the viewfinder, the determination of which will serve as precise coordinates of a touchscreen 1001 capture) upon trigger 1004 application, the light gun controller for actionable inputs 1000 will then wirelessly transmit these captured coordinates instantly to the touchscreen user device 1001 for related processing and respective electronic "actuation" or actionable touchscreen-coordinate engagement at point of capture. The premise of electronic "actuation" may be precisely managed, without suggestion of limitation, under the collaborative virtual mapping software being run on the touchscreen user device 1001. Furthermore, a light gun controller for actionable inputs 1000's driver software and/or mapping software (that may be present in any of the paired hardware devices and/or collectively, in the case of an input controller, more particularly still the input mapping software) may be, for example, programmed to consider screen-size determination and distance between the input device (a light gun controller for actionable inputs 1000) and touchscreen user device 1001 to best assess the pattern of pixilation produced by the image capture results (of the flashed rendering) upon trigger activation. OCR software, should it be necessary, may also be incorporated into the light gun controller for actionable inputs 1000, video-game console component 101 and/or touchscreen user device 1001, amongst other means serviceable, to assist with parsing the screen capture (digital image) into precise coordinates for the accurate wireless relay of mapping directives to an allied touchscreen user device 1001 (or a touchscreen user device 1001 being used independently thereof in a light-gun controller environment for actionable inputs 1000 not comprising a video-game console 101 component).

For those gamers seeking potentially greater compatibility and breadth across a variety of platforms and operating systems with less of an onus on software compatibility and/or calibration requirements, the inventor discloses a further iteration—the subject of FIG. 11—in an effort to address greater controller independence and freedom of operation. According to a light gun controller for actionable inputs' 1000 variant to that disclosed above, as additionally transitioned to a video-game environment for touchscreen interfaces, a receiving device and related disposition assembly for touchscreens is introduced comprising an infrared-sensor plurality (such as a plurality of photodiodes) designed to collaborate with an infrared emitter comprising a touchscreen-input device, such as a light gun designed for casting against the surface of a receiving device that is capable of coordinate detection of a projected light beam. And while not the focus of the present discussion, an infrared emitter is not limited to the use of a light-gun controller and may, of course, further manifest itself in kindred controller dispositions, where coveted. A wearable controller such as, but not limited to, a glove controller comprising finger tips equipped with at least one infrared emitter is readily transitioned into such an environment in accordance with this exemplary discourse. Further still, the application of sensors is not limited to the exemplary discourse (e.g. a mirrored apparatus housing a plurality of infrared emitters may be capable of recognizing the presence of the control input of a finger placed directly on, or proximately to, the display surface of the mirrored image in a kindred operating environment—thus, supplanting the need for user preconfiguration or the requisite need of entering a mapping interface prior to commencement of game play since the task may be automated under the mapped matrix of infrared emitters).

A receiving device 1100 and related assembly comprising an infrared-sensor 1101 plurality, in accordance with this exemplary discourse, is preferably sized in a way that conspicuous remote viewing 1102—such as that occurring from across the living room floor—by a user is possible. The infrared—sensors 1101 of the sensor plurality 1101 are preferably divided in an evenly distributed pattern across the entire receiving device's 1100 surface area, in a manner that may, for example, departmentalize each sensor 1101 to proximate a "finger-span" size in order to effectively manage (and prepare for associative touchscreen mapping) the entire surface area of the receiving device 1100 for correlative touchscreen 1103 actuation of a paired (and locked by targeting) actionable object by electronic or virtual means. A serviceable communicable system of coordinate mapping between the receiving device 1100 and the touchscreen user device 1104, in response to a manipulated controller input of a lightgun 1105, may comprise a system of software-driven electronic association or electronic "actuation". Across the face of the entire receiving device 1100, in a proximal manner, an acrylic (break-resistant) mirror 1106—capable of transmitting, or traversing through the mirror depth in its entirety, controller-born input 1105 communications such as an aimed light projection beam 1108 or light-beam casting 1108 by a light gun 1105—may be securely positioned. The broadcast image of the touchscreen user device 1104 is positionally manipulated such that it reflects first onto an intermediary relay mirror 1107, prone to angular manipulation, in such a manner that the relay mirror 1107 then reflects the broadcast image back (represented by the lines) onto said acrylic mirror 1106 encasing the face of the receiving device 1100 in a vantage that is shown right-side up to the user. In this way, a user will see the exact rendering—overcoming the properties of reflection according to its design—of the touchscreen's 1103 broadcast on the acrylic mirror's 1106 surface, and thus, be able to cast an infrared beam "directly" onto a game's broadcast-image rendering at its reflection point on the acrylic mirror 1106 surface in real-time (which of course, for repeated emphasis, permits a cast infrared-light beam to traverse through the mirror depth to the respective infrared sensors 1101 immediately below the acrylic mirror's 1106 surface, thereby permitting sensing of a coordinate input for the related and instant manipulation of an actionable object accordingly).

Management of a coordinate input under a microcontroller influence of the functional receiving device 1100, in the spirit and scope of this discourse, permits identical coordinate actuation directives (e.g. a precise touchscreen 1103 mapping point) to be relayed to a touchscreen user device 1104 for appropriate response to an input controller 1105 signal for purposes of manipulating an onscreen actionable object. A first-person or third-person perspective carnival game with shooter, for instance, with a plurality of tin cans strewn across a line on its display screen 1103, may see a can knocked off its mooring if its position represents the coordinate point captured by the receiving device 1100 (and transmitted for action—that is, virtual actuation—to a touchscreen user device 1104). Identical touchscreen mapping, according to this broadening iteration, is premised on the communicability (for example, in a wholly wireless disposition) between the various hardware components present and any engaged software component(s) responsible for faithful input-gesture 1108 translation to a touchscreen user device 1104 from the initial cast 1108 (a form of input) to an electronic actionable-mapping or virtual "discharge" (virtual actuation at a respective soft-button coordinate input 1109, for instance) for the intended manipulation of, without suggestion of limitation, an actionable object such as a tin can cited above.

According now to an analogous iteration describing transitional adaptation to a touchscreen, an infrared-light emitter station (placed proximal to a touchscreen user device, contrasting its kindred embodiment) comprising an infrared light emitter plurality is used. The infrared-light emitter station, upon broadcast, may collaboratively engage one or more remote infrared sensor(s)—such as a photodiode—and a distribution of one or more angle sensor(s) contained in the muzzle of a specialty-input controller (a touchscreen-input device), such as a light gun described. As a trigger is depressed on the light gun, for instance, the intensity of an incoming IR beam projection, exempli gratia, may be detected by the engaged infrared (e.g. photodiode) and angle sensor(s) in the light gun muzzle responsible for surveying a coordinate origination. Since intensity is based on factors such as angulation and distance from the infrared-light emitter station, the present method and assembly described leverages a solved trigonometric-equation system for calculating light-gun positioning relative to an infrared-light emitter station. Once respective angles of a broadcast agent (the infrared light projection) are determined by the angle sensors, as an infrared sensor receives an incidence of projection from the infrared light-emitter station, for example, a point of impact of an applied beam projecting from the infrared-light emitter station is electronically calculated and transmitted wirelessly for correlative touchscreen actuation, virtually, in the spirit and scope of this discourse and in accordance with an embodiment. An infrared light projection and/or patterns of infrared light-projection may also be readily integrated with a serviceable camera to be used to, exempli gratia, calculate relative positioning, observational vantage (e.g. where the light-gun is currently being aimed) and movements of a user (e.g. where a player is blocking the emitted pattern) and/or a controller device in an operating environment, if so coveted. A light-gun controller may, of course, also comprise its own sensor apparatus to facilitate any germane relative-positioning calculations for transition to a touchscreen gaming environment.

Light-gun muzzles comprising one or more photodiodes may also be injected into a touchscreen gaming environment such that upon depression of a light gun trigger, for example, the touchscreen may be instantly blanked out (also occurring at a rate imperceptible to a touchscreen user) to a black base wherein the diode then begins detection of a rapidly engaged rolling or digitally "painted" line of white that begins systematically traversing the entirety of the touchscreen and, thus, triggering the diode at a registration point in the course of traversal of said digitally painted "white scroll" (a registered point when the diode detects light subjected to it by the presence of this "white scroll"), the exact timing of this detection which is processed for related touchscreen orientation and virtual actuation of an actionable on-screen object at the point of mapping. This discussion too, of course, is in accordance with an embodiment and is advanced without suggestion of limitation. A method deploying ultrasonic sensors, for instance, in place of IR emitters, may also be serviceable to this discourse and those skilled in the art will appreciate the broader implications of this embodiment in its transitionary discourse to a touchscreen environment. Where impact-point precision is of less importance, designs may be adopted where angle detectors are instead replaced by, for instance, a quantity of 4 IR sensors for related integration. Furthermore, and relatedly speaking, 3 or more IR emitters, each with varying wavelengths and paired with the same quantity of sensors, are variants to this exemplary discourse that serviceably permit angle determination relative to the 3 or more emitters (with 3 emitters, 3 angles are processed) upon calibration and can be further adapted for integration into a touchscreen environment, although such articulation in this paragraph is not accompanied by illustration.

And in a further suggestion of breadth and scope to the associated discourse in transitioning a gun and/or rifle input controller to a touchscreen environment, a light gun may be further transitioned to a touchscreen environment such that the tip or muzzle of a light-gun controller may be subjected to camera-based tracking by an equipped touchscreen user device and its associated mapping software; such that as a communicative signal is received upon trigger depression by the user, the orientation of a light-gun pointer on the touchscreen (subject to said camera-based tracking) is calculated and a virtual "actuation" signal is applied at the actionable-object coordinate of calculated orientation by the mapping-software component. Parenting the aim of an equipped tracking camera (or the camera itself) to an object (such as the tip of the light gun or muzzle), and/or by engaging a camera-lock on feature, may also prove useful for tracking and integrative-mapping purposes under certain operating conditions. Graphical representations, such as with a manipulable and digitally-melded graphical ring traversing actionable content, may be complementary to this effort. Furthermore, a camera equipped with any serviceable camera-tracking and motion-tracking ability for objects, including a system that attaches a set of tracking markers to an object, such as the muzzle of a light gun, prime for optical tracking (and, exempli gratia, a trigonometric equation system capable of geometric positioning and orientation of a trackable object if germane to a gaming environment) is within the spirit and scope of this discourse. Such a method and assembly of object tracking, is, of course, encompassing fodder for a system that can prove equally adept at fully tracking a user (in his or her entirety) and/or a user's manipulated fingers and/or hands and/or body gestures for purposes of gesture-based mapping, motion-based mapping and/or virtual or electronic "actuation" of an actionable object at a mapped point on a touchscreen in response to said originating manipulation. Any serviceable motion-capture technology, including divining a marker-free motion, is equally serviceable to the present invention.

A light-gun controller device for touchscreen devices may further be equipped with a tracking apparatus capable of independently ascertaining, as an example without suggestion of limitation, its own locational proximity, orientation and where the light-gun controller is being aimed for serviceable integration into projection-based environments including those projected objects in living areas and/or walls which are both non-actionable objects and those that are projected-actionable objects (e.g. actionable if, exempli gratia, the aim of a light-gun controller is determined to be "locked on" to said projection as a result of remote intercommunication with the tracking apparatus and a serviceable mapping system comprising the touchscreen-device environment governing this example). The reader notes that this touchscreen-device environment may be equipped with at least one camera that may, of course, be integrated into a projection environment for tracking a serviceable projection and/or an associative input registration for mapped translation to a wireless touchscreen device in the spirit and scope of this discourse. The tracking apparatus of a light-gun controller may also send signals with the at least one camera for the intent and purpose of determining relative positioning.

In a further suggestion of serviceable diversity in application, an exemplary light-gun controller assembly equipped with serviceable location-determining technology may also operate under headphone jack application. As the location of a light gun pointer on a touchscreen is determined, by any means serviceable, the coordinate data may undergo processing by an inserted headphone-jack device that converts said data into an audio signal—with each locational qualifier (e.g. a correlated, distinct and individual virtual tile belonging to a virtual matrix or virtual-tile assembly) representing a unique audio signal for serviceable mapping. As the audio signal is sensed by the microphone of the touchscreen user device, processed and then manipulated through an embedded mapping application that is part of the controller assembly, virtual actuation of an actionable object associated with said geographical qualifier is thereby engaged.

For more detailed information concerning the integral subject matter of ITO deployment in the spirit and scope of a variant physical mapping system (contrasting a wholly virtual mapping interface or software counterpart of the preferred model) that may be adapted to a light-gun controller environment for actionable inputs 1000, the reader may refer to FIGS. 2, 3 and 4 and the related discussion set forth therein. Disposition of a variant mapping system that does not rely on virtual "actuation" of an actionable touchscreen object and instead relies on a physical capacitive source, such as that yielded by the control input of a finger and/or a small intermediary-transceiver device may also be serviceable to the thematic discourse herein. Furthermore, those skilled in the art will recognize that deployment of physical ITO-based overlays and attachment-based controllers that rely on the capacitive manipulation of an input into a controller environment, are also well suited for the lesser discussed application to desktop computer touchscreen monitors, although these too, may be governed by a wireless influence of any serviceable input controller and software-mapping compliment, in the spirit and scope of this discourse.

A small intermediary-transceiver device, in adding thematic colour by way of exemplary discourse, may be embedded directly into a receiving-device component of an engaged controller environment and exists communicably paired, by any serviceable means, with a light gun controller for actionable inputs 1000. The reader will recall the small intermediary-transceiver device, in concert with its coupled capacitive-discharge overlay, is able to fluently honour an independent conductive path from an ITO origin (or tile) up to and including an exit point at the bottom of the capacitive-discharge overlay. Since the capacitive-discharge overlay, in accordance with an embodiment, sits communicably nested in a homologous capacitive-distribution centre (e.g. an exemplary sleeve comprising a conductive pin assembly) found at its base, each independent conductive path remains actionable under the aegis of a capacitive source. The small intermediary-transceiver device comprises a capacitive manager and is capable of recurrently furnishing an innate capacitive source in the spirit and scope of this discourse. Once an input directive, for instance that initiated from a light gun controller for actionable inputs 1000, is registered by one or more receptive sensors of the receiving device with embedded intermediary-transceiver device—under the direction of one or more associated microcontroller unit(s)—an innate capacitive charge may be supplied or relayed to an enlisted pin's exit point. Since each respective conductive coating or channel originates at the capacitive-discharge overlay's base, and since each channel is conjoinedly positioned for targeted ITO deployment upon placement (by virtue of contactual overlap of the overlay's correlative "exit" point with an enlisted pin's exit point upon placement), a serviceable method and assembly is described to capacitate the remote manipulation of an actionable soft-object in a touchscreen-controller environment.

The related teachings of this specialty-controller impetus, also lend well to a potential wired light-gun variant with attachment, under a prescribed method and assembly, that falls within the breadth and scope of this discourse. And while any physical-interface attachment assembly is within the limits of the intellectual property footprint put forth by the inventor, where coveted and serviceable, any wired iteration may be interchanged with a kindred wireless variant remaining wholly attachmentless as the preferred modal input. Those skilled in the art will appreciate that the breadth and scope of all serviceable controller assemblies and associated physical and/or virtual mapping interfaces remain material to a discussion. Further, any controller assembly within the limits of the inventive disclosure, where coveted, may be modified for integration by virtue of a dock-connector pin system of the dock-connector assembly of a touchscreen user device in a manner that is directly attachable, engaged by wire or cable extension and/or wirelessly by a serviceable and/or paired coupler. The reader notes that each articulated embodiment (and any and all teachings in this paper and under common ownership of the inventor; direct or implied), including the full breadth and scope afforded under the present invention, may be considered for serviceability with a video-game console 101 component.

The embodiment(s) described, and any references in the specification to "one embodiment", "an embodiment", "an example embodiment", etcetera, indicate that the embodiment(s) described may include a particular feature, structure, or characteristic. Such phrases are not necessarily referring to the same embodiment. When a particular feature, structure, or characteristic is described in connection with an embodiment, persons skilled in the art may realize the potential to effect such a feature, structure, or characteristic in connection with other embodiments whether or not explicitly described. A particular feature, structure, or characteristic described in an embodiment may be removed; whilst still preserving the serviceability of an embodiment.

While a functional element may be illustrated as being located within a particular structure, other locations of the functional element are possible. Further, the description of an embodiment and the orientation and layout of an element in a drawing are for illustrative purposes only and are not suggestive of limitation. The embodiments described, and their detailed construction and elements, are merely provided to assist in a comprehensive understanding of the invention. Any description is not to be taken in a limiting sense, but is made merely for the purpose of helping illustrate the general principles of the invention.

While embodiments may be illustrated using portable devices, the particularity of these embodiments are not limited to application of portable devices and may instead be applied to stationary devices. For purposes of the discussion that follows, the term "user device" can encompass both portable and stationary devices.

While the noted embodiments and accompanying discourse and illustrations of the invention disclosed herein can enable a person skilled in the art (PSITA) to make and use the invention in its detailed exemplary embodiments, a skilled artisan will understand and appreciate the actuality of variations, modifications, combinations, atypical implementations, improvements and equivalents of any of the specific embodiments, methods, illustrations and examples listed herein.

While the present invention has been described with reference to such noted embodiments, methods, illustrations and examples, it is understood by a skilled artisan that the invention is not limited to any of the disclosed embodiments, methods, illustrations and examples, but by all embodiments, methods, illustrations and examples within the spirit and scope of the invention. The scope of the following claims, and the principles and novel features, amongst the discourse herein, is to be accorded the broadest interpretation so as to encompass all modifications, combinations, improvements and equivalent structures and functions.

Any particular terminology describing certain features or aspects of the invention is not suggestive of language restricted to any specific characteristics, features, or aspects of the invention with which that terminology is associated. Furthermore, any reference to claim elements in the singular, for example, using the articles "a," "an," or "the," is not to be construed as limiting the element to the singular.

I claim:

1. A linked video game system for a touchscreen device, comprising:
    a video game console in communication with a touchscreen device, wherein said touchscreen device serves as external media for the video game console;
    a controller remote from the touchscreen device and configured to transmit and receive input directives associated with the external media for the purpose of manipulating at least one actionable input on said touchscreen device; and
    a display configured for receiving and transmitting audio and video content of the external media for user consumption;
    wherein one or more sensor inputs of the controller configured to detect motion of the controller as a whole are mapped for correlative engagement of the motion-detecting sensor inputs of the remote touchscreen device such that results of actuation of the one or more sensor inputs of the controller by movement of the controller are translated to the remote touchscreen device by virtual and/or mechanical influence;
    wherein there is no fixed position between the remote controller and the touchscreen device.

2. The video game system of claim 1, wherein said video game console comprises a mechanical apparatus for faithfully reproducing movement of said controller on said touchscreen device in the translation of controller sensor input actuation results to the touchscreen device.

3. The video game system of claim 2, wherein said mechanical apparatus comprises a receiving member upon which said touchscreen device is anchored, said receiving member adapted for controlled movement.

4. The video game system of claim 1, wherein said video game console comprises a software-based, non-mechanical system for mapping of controller sensor inputs for engagement of touchscreen device sensor inputs in the translation of controller sensor input actuation results to said touchscreen device.

5. The video game system of claim 1, further comprising at least one camera for tracking and transmitting an input gesture for translation to an application on said touchscreen device.

6. The video game system of claim 5, further comprising a sensor system for tracking a user, including the user's positional depth, for translation of user gestures to an application on said touchscreen device.

7. The video game system of claim 1, wherein said video game console comprises a digital-media receiver component supporting streaming audio and video services.

8. The video game system of claim 1, wherein said video game console comprises a set-top box component with tuner, allowing simultaneous access to TV broadcast and internet applications by virtue of a serviceable internet capability.

9. The video game system of claim 1, wherein said controller transmits signals to, and receives signals from, said video game console by wire, wirelessly, or both.

10. The video game system of claim 1, wherein said controller transmits signals to, and receives signals from, said display by wire, wirelessly, or both.

11. The video game system of claim 1, wherein said controller transmits signals to, and receives signals from, said touchscreen device by wire, wirelessly, or both.

12. The video game system of claim 1, wherein said video game console transmits signals to, and receives signals from, said display by wire, wirelessly, or both.

13. The video game system of claim 1, wherein said video game console transmits signals to, and receives signals from, said touchscreen device by wire, wirelessly, or both.

14. The video game system of claim 1, further comprising a camera and an associated motion tracking software module configured to track a user's gesture for mapping the gesture to one or more correlative actionable inputs on the touchscreen device.

15. The video game system of claim 1, further comprising a virtual-grid or matrix system for mapping a user gesture to an actionable input on the touchscreen device.

16. The video game system of claim 1, wherein said controller is a specialty controller.

17. The video game system of claim 1, further comprising an attachable capacitive-discharge overlay configured for delivery of capacitance to a touchscreen using a conductive network.

18. The video-game system of claim 1, wherein based on a proximity event with the touchscreen device running an application, the video-game console automatically initiates application-related functionality.

19. The system of claim 1, wherein at least one of the sensor inputs for detecting motion of the controller as a whole is an accelerometer and is mapped for engagement of a correlative accelerometer of the touchscreen user device.

20. A linked video game system for a touchscreen device, comprising:
a video game console in communication with a touchscreen device, wherein said touchscreen device serves as external media for the video game console;
a controller configured to transmit and receive input directives associated with the external media for the purpose of manipulating at least one actionable input on said touchscreen device; and
a display configured for receiving and transmitting audio and video content of the external media for user consumption,
wherein said touchscreen device is designed for contactual alignment with an adjunct transceiver device comprising an innate capacitive source, manager and distribution node assembly.

21. The video game system of claim 20, wherein said distribution nodes, when in position, are configured to actuate targeted actionable objects on a touchscreen in response to the controller input.

22. The video game system of claim 20, wherein said distribution nodes are activated by a gesture by a user, as detected by a tracking camera and software, which is remotely reproduced onto said touchscreen device by said distribution nodes.

23. The video game system of claim 20, wherein said adjunct transceiver device is configured to map said distribution nodes to scale with respect to dimensions of said touchscreen device.

24. The video game system of claim 20, wherein said adjunct transceiver device is configured to circumvent said distribution nodes to virtually actuate at least one actionable input wirelessly.

25. A video game controller system, comprising:
a controller configured to link with a remote touchscreen device by wire, wirelessly, or both, comprising a plurality of inputs, the plurality of inputs comprising one or more sensor inputs for detecting motion of the controller as a whole;
wherein one or more user inputs actuate one or more of the controller sensor inputs for detecting motion of the controller as a whole;
wherein one or more of the sensor inputs of the controller are mapped for engagement of correlative motion detecting sensor inputs of the remote touchscreen device by virtual and/or mechanical impartment;
wherein there is no fixed position between the remote controller and the touchscreen device; and
wherein said touchscreen device is embedded with at least one application for actionable engagement.

26. The system of claim 25, wherein at least one of said user inputs is an actuation of a button on said controller, wherein the button is mapped for engagement of a correlative input mapped on said touchscreen device when said button on said controller device is actuated.

27. The system of claim 25, further comprising a camera-based system comprising a camera and motion-tracking software, wherein at least one of the user inputs is a user gesture determined by the camera based system, wherein said camera-based system is mapped for engagement of correlative touchscreen inputs of said touchscreen device in response to the determined gesture.

28. The system of claim 25, further comprising an input interface, wherein the input interface is mapped for engagement of a correlative touchscreen input on the touchscreen device in response to manipulation of the input interface.

29. The system of claim 25, further comprising a mechanical apparatus for engagement of correlative motion detecting sensor inputs of the remote touchscreen device.

30. The system of claim 25, wherein the engagement of correlative motion detecting sensor inputs of the remote touchscreen device is virtual.

31. A combination video game controller and touch-sensitive surface, comprising:
a controller, comprising at least one sensor for detecting motion of the controller as a whole and a touch-sensitive surface linked with a remote touchscreen device interface by wire, wirelessly, or both; and an interactive system configured to faithfully impart upon said touchscreen device interface one or more gestures imparted to the controller by a user by mechanical and/or virtual reproduction of said gesture;

wherein at least one of said gestures is an actuation of a position on the touch-sensitive surface of said controller, said interactive system actuating a correlative actionable input of said touchscreen device interface when said gesture is made;

wherein at least one of said gestures is an actuation of one or more of the sensors for detecting motion of the controller as a whole, said interactive system actuating one or more correlative actionable sensor inputs associated with said touchscreen device interface when said gesture is made; and wherein there is no fixed position between the video game controller and the embedded touchscreen device interface and its physical host.

* * * * *